US012168270B2

(12) United States Patent
 Hsu

(10) Patent No.: US 12,168,270 B2
(45) Date of Patent: Dec. 17, 2024

(54) MANUAL TOOL TRACKING AND GUIDANCE WITH INERTIAL MEASUREMENT UNIT

(71) Applicant: ILLINOIS TOOL WORKS INC., Glenview, IL (US)

(72) Inventor: Christopher Hsu, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 147 days.

(21) Appl. No.: 15/004,801

(22) Filed: Jan. 22, 2016

(65) Prior Publication Data
US 2016/0214198 A1  Jul. 28, 2016

Related U.S. Application Data

(60) Provisional application No. 62/106,283, filed on Jan. 22, 2015.

(51) Int. Cl.
 *B23K 9/095* (2006.01)
 *B23K 37/02* (2006.01)
 (Continued)

(52) U.S. Cl.
 CPC .......... *B23K 9/0956* (2013.01); *B23K 9/0953* (2013.01); *G01C 25/00* (2013.01); *B23K 37/0205* (2013.01); *G01P 21/00* (2013.01)

(58) Field of Classification Search
 CPC ............. H05H 1/34; H05H 2001/3468; H05H 2001/3478; B23K 37/025; B23K 9/00;
 (Continued)

(56) References Cited

U.S. PATENT DOCUMENTS 4,399,346 A * 8/1983 Kearney .............. B23K 9/0956
 219/124.34
6,903,300 B2 * 6/2005 Faust ...................... B23K 9/08
 219/121.54
(Continued)

FOREIGN PATENT DOCUMENTS

CN 1794439 6/2006
EP 0554464 8/1993
(Continued)

OTHER PUBLICATIONS

FIS1100 6D Inertial Measurement Unit with Motion Co-Processor and Sensor Fusion Library, 2015 Fairchild Semiconductor Corporation, https://www.fairchildsemi.com/datasheets/FI/FIS1100.pdf.
(Continued)

*Primary Examiner* — Nathaniel E Wiehe
*Assistant Examiner* — Thomas J Ward
(74) *Attorney, Agent, or Firm* — McAndrews, Held & Malloy, Ltd.

(57) ABSTRACT

A welding system comprises a hand-held weld tool comprises a positioning and orientation measurement system having an inertial measurement unit (IMU), a processing subsystem, and a calibration apparatus. The processing subsystem is operable to compute, based on data generated by the IMU during a weld operation on a workpiece, one or more actual motion attributes for the hand-held weld tool. The calibration apparatus is configured to hold the hand-held weld tool in a known position and orientation and in stationary state for calibration of the positioning and orientation measurement system.

28 Claims, 18 Drawing Sheets

(51) Int. Cl.
*G01C 25/00* (2006.01)
*G01P 21/00* (2006.01)

(58) Field of Classification Search
CPC .................. B23K 9/095; B23K 9/0956; G02B 2219/45135
USPC ........ 434/234; 219/137 R, 136, 108, 121.48, 219/130.5; 367/118, 129
See application file for complete search history.

(56) References Cited

U.S. PATENT DOCUMENTS

| | | | |
|---|---|---|---|
| 2007/0038400 A1* | 2/2007 | Lee ........................ | B23K 11/24 702/103 |
| 2007/0080150 A1* | 4/2007 | Albrecht ................ | B23K 9/10 219/130.01 |
| 2007/0080151 A1 | 4/2007 | Albrecht et al. | |
| 2009/0298024 A1 | 12/2009 | Becker | |
| 2011/0117527 A1* | 5/2011 | Conrardy ............. | B23K 9/0956 434/234 |
| 2011/0220619 A1 | 9/2011 | Mehn | |
| 2013/0206740 A1 | 8/2013 | Hutchison | |
| 2013/0206741 A1* | 8/2013 | Pfeifer .................. | B23K 9/095 219/130.01 |
| 2013/0208569 A1 | 8/2013 | Hutchison | |
| 2013/0264323 A1* | 10/2013 | Daniel ................... | B23K 9/093 219/137 PS |
| 2013/0277345 A1* | 10/2013 | Holverson .......... | B23K 9/0956 219/130.01 |
| 2014/0134579 A1 | 5/2014 | Becker | |
| 2014/0134580 A1 | 5/2014 | Becker | |
| 2014/0263224 A1 | 9/2014 | Becker | |
| 2014/0272835 A1 | 9/2014 | Becker | |
| 2014/0272836 A1 | 9/2014 | Becker | |
| 2014/0272837 A1 | 9/2014 | Becker | |
| 2014/0272838 A1 | 9/2014 | Becker | |
| 2014/0374396 A1 | 12/2014 | Luo et al. | |
| 2016/0039053 A1* | 2/2016 | Becker .................. | G09B 19/24 228/8 |

FOREIGN PATENT DOCUMENTS

| | | |
|---|---|---|
| EP | 2537620 A1 | 12/2012 |
| WO | 2014188244 | 11/2014 |

OTHER PUBLICATIONS

3-Axis Digital Compass IC HMC5883L, Honeywell, http://cdn.sparkfun.com/datasheets/Sensors/Magneto/HMC5883L-FDS.pdf.
Kumar, V., et al., Investigation of the A-TIG Mechanism and the Productivity Benefits in TIG Welding, May 2009, http://www.twi-global.com/technical-knowledge/published-papers/investigation-of-the-a-tig-mechanism-and-the-productivity-benefits-in-tig-welding-May 2009/.
GMA Welding Procedures, Fundamentals of Professional Welding, Jun. 6, 2015, http://free-ed.net/free-ed/Courses/05%20Building%20and%20Contruction/050205%20Welding/Welding00.asp?iNum=0810.
Fairchild "FIS1100" 6D Inertial measurement Unit with Motion Co-Processor and Sensor Fusion Library, 51 pgs, Aug. 2015, <https://www.fairchildsemi.com/datasheets/FI/FIS1100.pdf>.
Honeywell, 3-Axis Digital compass IC HMC5883L, 20 pgs., Mar. 2011, <http://cdn.sparkfun.com/datasheets/Sensors/Magneto/HMC5883L-FDS.pdf>.
V. Kumar et al., TWI, Investigation of the A-TIG mechanism and the productivity benefits in TIG Welding, May 3, 2009, <http://www.twi-global.com/technical-knowledge/published-papers/investigation-of-the-a-tig-mechanism-and-the-productivity-benefits-in-tig-welding-May 2009>.
Fundamentals of Provessional Welding, vol. 2.0, "GMS Welding Procedures," Jun. 6, 2015, http://free-ed.net/free-ed/Courses/05%20Building%20and%20Contruction/050205%20Welding/Welding00.asp?iNum=0810.
IP Bewertungs AG (IPB), Intelligenter Schweißbrenner, Intelligent Welding Torch, Automatic Parameter Setting, 21 pgs. Germany.
Frank Saopeng Cheng, Central Michigan University, US, Robot Manipulators, "Calibration of Robot Reference Frames for Enhanced Robot Positioning Accuracy," Sep. 2008, www.intechopen.com, 19 pgs.
Dr. Robert Lutwak, "Micro-Technology for Positioning, Navigation, and Timing Towards PNT Everywhere and Always," DARPA, Oct. 29, 2014,26 pgs.
Ned Parnian and Farid Golnaraghi, "Integration of a Multi-Camera Vision System and Strapdown Inertial Navigation System (SDINS) with a Modified Kalman Filter," IEE DARPA Feb. 2014 paper 06782498, Sensors ISSN 1424-8220, 2010, 10, 5378-5394; doi:10.3390/s100605378, 17 pgs.
Andreas Sternowski, "Handheld Welding Tourch with Position Detection," Sep. 21, 2011, 11 pgs.
Int'l Search Report and Written Opinion for PCT/US2016/014627 dated May 18, 2016 (11 pages).

\* cited by examiner (end view)

(side view)

MANUAL TOOL TRACKING AND GUIDANCE WITH INERTIAL MEASUREMENT UNIT

PRIORITY CLAIM

This application claims priority to the following application, which is hereby incorporated herein by reference:
U.S. provisional patent application 62/106,283 titled "Manual Tool Tracking and Guidance" filed on Jan. 22, 2015.

BACKGROUND

Many applications require the use of manual or semi-automatic, as opposed to fully automatic, tools such as welding torches, plasma cutters, saws, nailers, and the like. Manual tools, however, leave a lot of room for imprecision, human error, and unsatisfactory results even in the hands of skilled operators. In manual welding using hand-held tool, e.g. a welding torch, it is important to aim the tool at the desired seam of the joint; to orient the tool spatially with respect to the joint and with respect to the travel direction; to move the tool at the right speed for desired heat input, penetration, and bead profile; to dwell the tool at the beginning of weld for weld start and at the end of the weld for crater fill; to weld in proper positions such as flat/horizontal/vertical/overhead and those specified in EN26947 and ASME section IX; to turn the corner properly; to slow down or speed up at certain joint locations; to weld at various locations within a workpiece in the right sequence for distortion and residual stress control; to stack the weld in proper overlapping pattern in multi-pass welding; to weave the torch in a prescribed pattern; and to perform tack weld according to weld procedure prior to main structural weld, etc. Thus, the welding-by-hand tool heavily depends on the motor skills of operators, their hand-eye coordination, and their mental faculties to adhere and conform to weld procedure specification and the fabrication drawings. It is desirable for fabricators to reduce the training costs of human operators so that a less skilled operator can still produce sound welds that meet the quality requirement, and to rate operators and job candidates' dexterity to maneuver the welding torch for job assignment. It is also desirable for fabricators to monitor and record the actual movement, orientation, and tremor of the hand tool and actual weld sequencing in production for quality assurance and worker training and health & safety purposes. Limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Systems and methods are provided for an intelligent hand-held tool with sensors to sense its own motion, orientation, and position with respect to the weld joint in the workpiece; and to perform tracking and guidance, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

An inertial measurement unit (IMU) is a microelectromechanical system (MEMS) sensor for motion measurements. It may comprise one or more accelerometer (to sense linear acceleration, velocity and position), one or more gyroscope (to sense angular velocity and position), and/or one or more magnetometer (e.g., used for calibration against orientation drift). An example of a commercially available 6D (6 degrees of freedom) IMU is Fairchild FIS 1100, with 3-axis accelerometer, and 3-axis gyroscope in one package. An example having a 3-axis magnetometer is Honeywell HMC5883L. The combination of 3-axis accelerometer, 3-axis gyroscope, and 3-axis magnetometer may provide a 9D (9 degrees of freedom) IMU for motion sensing. Although gyroscopes are commonly used in IMU to supplement accelerometers, it is possible to rely on more accelerators with increased degrees of freedom (e.g. 6-9 linear accelerators disposed at each face of a cube) to determine the kinematics of a rigid body without gyroscopes, or an all-accelerometer IMU with improved performance. The mounting of one or more IMUs at various locations of a hand-tool (e.g. at the handle away from the tool center point (TCP), and/or near the tool center point (TCP), and/or other locations) may provide simpler kinematics calculations and may distinguish intended motion vs. involuntary motion (tremor). TCP is typically used for a feature of a tool held by an automation device rather than hand, for the purpose of this disclosure it encompasses hand-held tool as well. For the purpose of this disclosure, IMU refers to one or more accelerometers, with or without one or more gyroscopes and/or magnetometers, at various locations of the hand-tool, to feed kinematic computation of linear and angular motion. In certain embodiments, the disclosure also includes a "multi-modal" approach, e.g. the addition and integration of other non-IMU sensor, such as camera, GPS, acoustics, proximity, laser, etc.

Figure 1A:
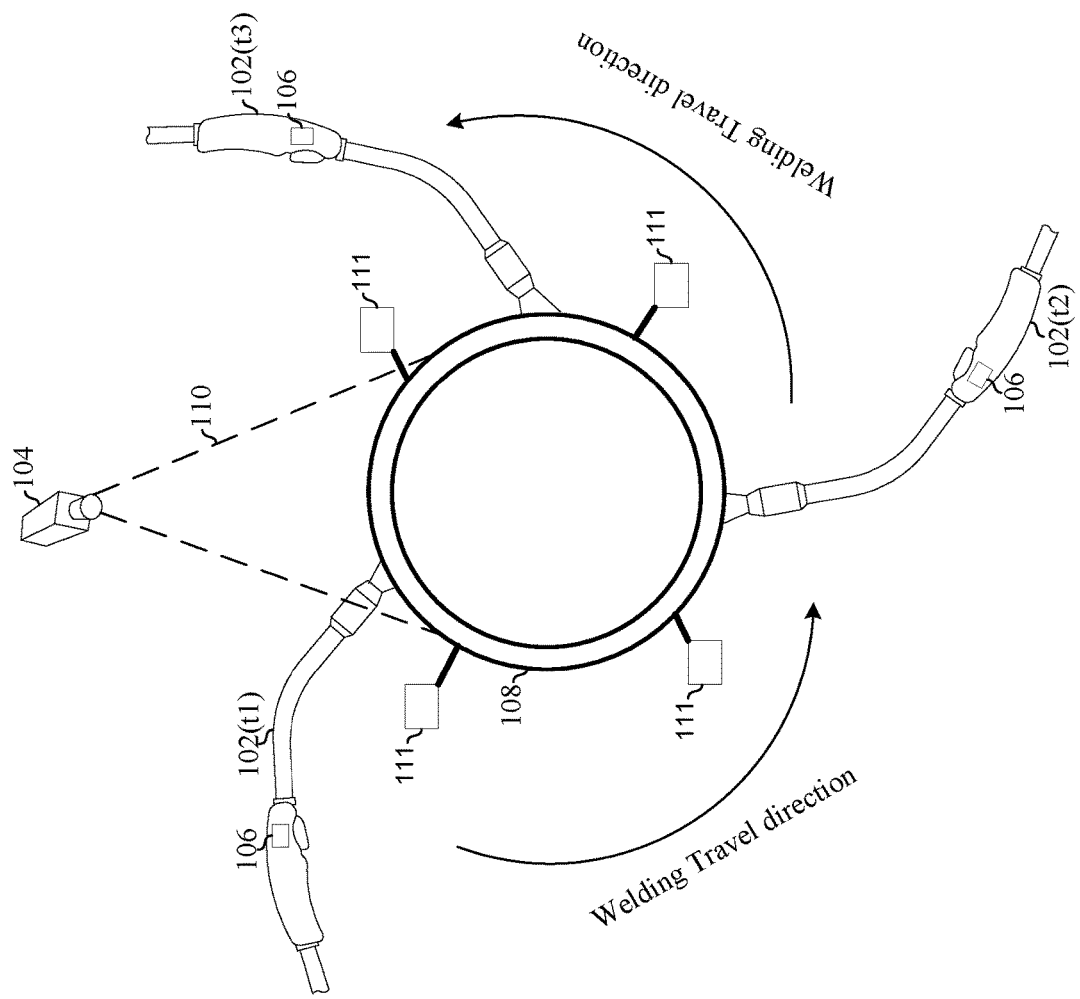
FIG. 1A is a diagram illustrating an example manual tool with on-board and external sensors for tracking and guiding the tool.

FIG. 1A is a diagram illustrating an example manual tool with on-board sensors and/or cameras for tracking and guiding the tool.

Shown is a tool 102 comprising sensor(s) 106 mounted in or on it, and a camera 104 that is separate from the hand-held tool 102. In various example embodiments, the tool 102 may comprise, for example, a welding torch, a plasma cutter, a heating torch, an induction heater, a nail gun, a mechanical saw, and/or the like. The tool 102 is being applied to a workpiece 108. In the example shown, the workpiece 108 is a pipe and the operator of the tool 102 is attempting to follow a joint seam path 112 along the circumference of the pipe with the tool 102. The torch is shown at three time instants, t1, t2, and t3, as it travels around the pipe. In the example shown, the path follows a joint to be welded by manual welding torch 102. In another example implementation, the path is a path to be cut by a plasma cutter 102 or saw 102. In another example implementation, the path is a path to be nailed at regular intervals by a nailing gun 102. These examples are just illustrative, similar applications with many other manual tools can be envisioned.

The sensor(s) 106 may comprise one or more IMUs. In the case where the tool 102 is a welding or cutting torch, the sensor(s) 106 may also comprise voltage and/or current sensors for sensing the voltage at the electrode of the torch 102. In various example implementations, the sensor(s) may also comprise a global navigation system (GPS) receiver, a local positioning system (LPS) receiver, and/or a camera. For example, where the tool 102 is a GTAW welding torch, the sensor(s) 106 may comprise a co-axial a camera can be installed above the tungsten electrode to capture images of the weld puddle and the joint, but with the electrode out of focus so as not to interfere with the view of the weld pool and/or joint. The sensor(s) 106 may provide readings relative to its own coordinate system. Accordingly, the electronic tool tracking/guiding system may need a way to relate the coordinate system and position of the sensor(s) 106 to the orientation and position of the workpiece 108 so that motion data or attributes such as work angle, travel angle, TCP aim (such as wire placement), travel speed along path 112, etc. can be determined. To determine the orientation of the workpiece 108, the average direction over a previous time interval (e.g., previous second) may be accumulated and assumed to be the orientation of the path 112, the work and travel angles can then be determined by comparing the determined orientation of the path 112 over the previous time intervals with the instantaneous direction (as reported by the sensor(s) 106 and/or camera(s) 104). The sensor(s) 106 may comprise two or more IMUs in the body of tool 102 spaced apart with known distances to determine orientation of torch and the motion of the TCP in world coordinate system.

Figure 1B:
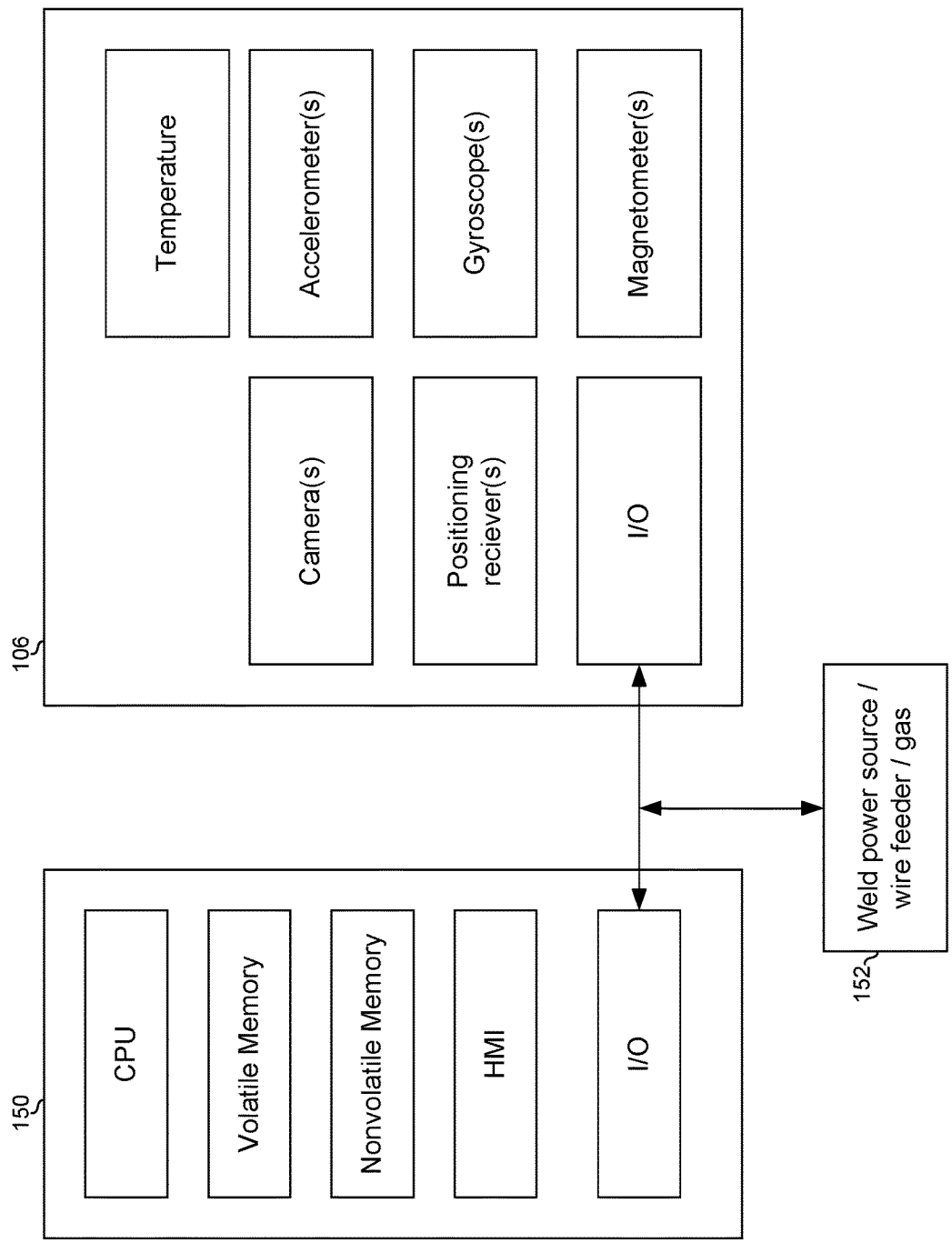
FIG. 1B illustrates example circuitry of the sensor(s) of FIG. 1A.

Referring briefly to FIG. 1B, the sensor(s) 106 may be communicatively coupled to a processing subsystem 150 comprising, for example, a CPU, DSP, FPGA, CPLD, ASIC, SoC, GPU, ADC, volatile and/or non-volatile memory, battery, clock/oscillator, and input/output circuitry for communication of signals to/from the processing subsystem including RF wireless communications (e.g., to/from the sensor(s) 106 and to/from circuitry providing a user interface for the operator of the tool 102). The processing subsystem 150 may, for example, be integrated into the tool 102 and/or may be external (e.g., in a server, a gateway, a cloud computing platform, a personal computer, a smartphone, a tablet, a user interface, an operator wearable or personal protective equipment, a welding power source, a robot, a welding system controller, or the like). The processing subsystem 150 is configured to perform kinematic calculations based on the output of the sensor(s) 106. As shown, the processing system is also communicatively coupled to the welding power source, wire feeder, and/or gas valve 152. While some relatively simple calculations of penetration, weld size (e.g., a measure of the cross sectional area of the weld), cooling rate, and/or other parameters described are provided herein as examples and are suitable for even for a processing system 150 have very limited resources, more sophisticated computations may of course be used where sufficient processing power is available (e.g., where the computations are performed in the cloud with the predictive models mentioned herein). In an example implementation, the processing subsystem 150 computes predictions for one or more of: weld microstructure, hardness, defect and discontinuity, residual stress and distortion, and mechanical properties based on such models. The prediction done in the cloud then can be communicated back to the welding equipment in real time for feedback control.

Returning to FIG. 1A, the camera 104 (and, in an example implementation, a camera of sensor(s) 106) is operable to capture images using any electromagnetic waves of any suitable wavelength (e.g., infrared, near infrared, visible spectrum etc.) and/or sound waves (e.g., ultrasound). Camera 104 may, for example, be a greyscale imaging camera (including high-dynamic range camera), a laser scanning camera, and/or a time-of-flight (ToF) camera. The field of view of the camera 104 is called out as 110. As can be seen, in the example implementation of FIG. 1, the torch 102 is within view of the camera 104 for only a portion of the path, and is hidden from view by the workpiece 108 at other points along the path. At times when the torch 102 is within the field of view 110, data from the camera 104 may be used for calibrating the sensor(s) 106 (i.e. compensating for drift that typically occurs in an IMU). However, when the torch is outside the field of view, the sensor(s) 106 may continue to provide hand tool motion feedback signals similar to a car in a tunnel when a GPS signal is lost. In an example implementation, a priori knowledge of the workpiece 108 (e.g. diameter, orientation, material type, thickness, 3D CAD model, and/or the like), maximum speed (e.g., to a desired number of standard deviations from average tool travel speed), expected range of motion envelope, etc. may be used for determining actual travel speed, actual travel distance, and/or other kinematics calculations. In this manner, the combination of camera 104 and sensor(s) 106 may be able to track motion of hand tool in applications where deploying multiple cameras to observe the entire path is commercially or practically infeasible. Nevertheless, in other implementations multiple cameras 104 may be used to capture other angles of the workpiece 108, other angles of the tool 102, and/or the surrounding environment. In some embodiments, there are a plurality of cameras 104 (e.g. two or three) with multiple fields of view 110 around workpiece 108 so that sensor 106 may be calibrated more than once during a weld.

In another embodiment, a known magnetic field may be created around the workpiece 108 for the calibration of 102, instead of using camera 104. Magnetic field emitters (e.g. coils with flux concentrators) 111 can be integrated into the weld fixture (e.g. internal and external clamps, band etc.) in known locations of the workpiece 108. The magnetic field strength may be substantially greater than the earth magnetic field. Alternatively, the magnetic field emitter may be integrated into tool 102 (i.e., the sensors 106 may comprise a magnetic field emitter) and multiple sensors (e.g. magnetometers) 111 may be integrated into weld fixture at various locations close the weld seam along a weld for sensing tool orientation (e.g., relative to the weld joint) and/or weld position (e.g., sensing whether in 1G ("flat"), 2G ("Horizontal"), 3G ("Vertical Upward/Downward"), 4G ("overhead"), 5G ("pipe-horizontal"), or 6G ("pipe 45°") position), and the calibration of sensor integrated into tool 102.

In an example implementation, the sensor(s) 106 may be used to manage power consumption of welding equipment. For example, when an IMU indicates that the torch 102 has been sitting still for some determined period of time, the tool 102, its power source, and/or other ancillary equipment may be placed into a low-power state. Upon the IMU indicating movement of some determined characteristics (e.g., an acceleration above a determined threshold), the torch 102, its power source, and/or other ancillary equipment may be switched into a ready state. For example, for a utility-powered torch 102 the main transformer may be energized and for a engine-driven welder the engine may switch from an idle speed to higher RPMs.

Figure 2A:
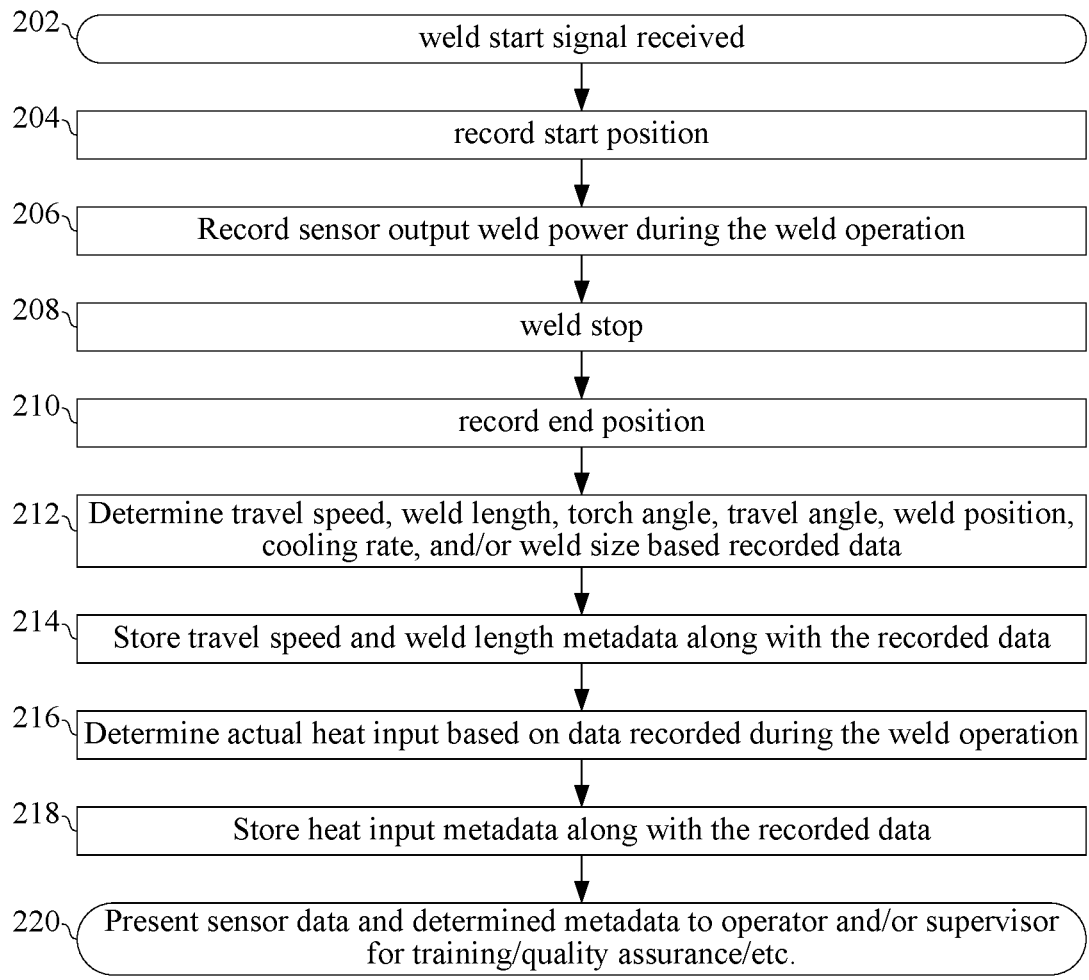
FIG. 2A is flowchart illustrating an example method for processing of sensor data for determining various characteristics of a weld operation.

FIG. 2A is flowchart illustrating an example method for processing of sensor data for determining various characteristics of a weld operation.

In block 202, the processing subsystem 150 receives a signal that an arc has been ignited between the torch 102 and workpiece 108.

In bock 204, in response to the weld start signal in block 202, the processing subsystem stores the weld start time, the output(s) of the sensor(s) 106 at the start time, and the position of the arc at the start time (e.g., referenced to a three-dimensional coordinate system determined during initial calibration of the torch 102 as, for example, described below with reference to FIGS. 3B and 3C).

In block 206, as the torch 102 proceeds along the path during the weld operation, the outputs of the sensor(s) 106 (e.g., accelerometer output, gyroscope output, magnetometer output, welding voltage (e.g., at the power source, the torch input, the electrode, the arc, or any other suitable point of reference) sensor output, and welding current sensor output) are periodically and/or occasionally sampled and stored to memory.

In block 208, the processing subsystem 150 receives a signal that the arc has been extinguished.

In block 210, in response to the weld stop signal in block 210, the processing subsystem 150 stores the weld stop time, the output(s) of the sensor(s) 106 at the stop time, and the position of the arc at the start time (e.g., referenced to a three-dimensional coordinate system determined during initial calibration of the torch 102 as, for example, described below with reference to FIGS. 3B and 3C).

In block 212, the processing subsystem 150 uses the sensor data stored during the weld operation to determine torch travel speed at various points along the path of the completed weld, and to determine the length of the completed weld. This may comprise, for example, computing the time integral of accelerations output of by sensor(s) 106 along the path to determine the instantaneous velocity (travel speed and direction) of the tool 102 at various points along the path. This may also comprise averaging the determined instantaneous travel speeds averaged over certain lengths/portions of the weld to determine an actual (as opposed to predetermined or expected) travel speed over those lengths/portions. Further, this may comprise accumulating the actual weld speed over the time of the weld to determine actual weld length. The determination of actual travel speed may be performed automatically without any user input, or guesses, or mistakes, and without any prior knowledge of the workpiece 108 or the geometry of the weld path. The actual heat input per unit length may be computed by processing subsystem 150 by integrating instantaneous power over time and dividing it by actual weld length along the weld path. Details of the heat input calculations can be found in ASME section IX appendix QW409.1 method (c) and ISO/DTR18491. In block 212, the weld path may not be a straight line. For example, it may be a zig-zag path or a curved path. Referring briefly to FIG. 2E, an example of a zig-zag path resulting from torch weaving is shown. In this case, two methods of heat input calculation may be performed, using either the L1, L2, . . . L10 trajectory (the actual path traced by the arc), or L100 trajectory. In addition, actual weld size (e.g. fillet weld leg size) may be calculated (e.g. proportional to the square-root of the heat input). In case the torch 102 is weaved by operator, there are two ways to calculate weld length. In FIG. 2E, the weld length can be the sum of L1, L2, . . . , L10, or it can be L100 along the averaged torch travel direction. In an example implementation, average weld speed for a weaved path such as shown in FIG. 2E may be the average speed along L100. Processing subsystem 150 may determine this average speed using position information from the sensors 106 in combination with geometric calculations and/or in combination with a priori knowledge about the weld (e.g., characteristics of the weave set forth in the WPS).

Returning to block 212 of FIG. 2A, in an example implementation, cooling rate (and resulting microstructure, hardness, residual stress and distortion, and mechanical properties) may be calculated based on the determined actual heat input (e.g., may be calculated based on being inversely proportional to actual heat input). The cooling rate may, for example, be computed by the inverse of the product of heat input and initial plate temperature (measured by temperature sensor in FIG. 1B). In an example implementation, block 212 may also involve determination of one or more of the following based on the recorded data: torch angle, travel angle, weld position, and/or weld size may be determined in block 212.

In block 214, the actual travel speed and actual weld length values determined in block 212 are stored along with the sensor data recorded during the operation (i.e., samples or groups of samples of the sensor data are "tagged" with corresponding speed and/or length values).

In block 216, the processing subsystem 150 determines the actual heat input to the weld based on the sensor data collected during the weld operation. This may comprise, for example, integrating instantaneous weld power (calculated from the captured welding voltage and welding current values) over the actual weld length (determined in block 216). The actual heat input may be calculated over certain lengths/portions of the weld. For example, the integration may be performed per inch of actual weld to determine actual heat input in kilojoules per inch of weld length (KJ/in). The determination of actual heat input may be performed automatically without any user input, or guesses, or mistakes, and without any prior knowledge of the workpiece 108 or the geometry of the weld path.

In block 218, the actual heat input values determined in block 212 are stored along with relative weld location data (e.g. 10% into a completed weld) recorded during the operation (i.e., samples or groups of samples of the sensor data are "tagged" with corresponding heat input values so that, for example, a graph of instantaneous heat input along the weld line can be made). Quality control limits may be placed on the heat input values along the weld line and deviation outside the control limits may be flagged for targeted visual inspection or other nondestructive testing. At the completion of a weld, actual heat input, estimated cooling rate and/or estimated weld size may be compared with WPS (weld procedure specification) and nonconformance can be identified.

In block 220, the captured sensor data and the metadata are presented via a human machine interface (HMI) of the processing subsystem 150 (e.g., via an LED or LCD on the torch, on headwear worn by the operator, on a smart watch worn on a wristband of the operator, etc.). Any nonconformance of travel speed, torch travel angle, work angle, heat input, cooling rate and weld size may trigger a paint sprayer which is automatically activated immediately after the weld stop to mark the suspect weld. The presentation of the data and/or metadata may be used for operator training, quality assurance of the weld, and/or any other desired purpose.

Instead of determining and presenting the metadata as a post-processing function, it may be performed in real-time during the weld operation. Travel speed, torch angle, travel angle, heat input, cooling rate and weld size can be calculated based on sensor data on the fly as welding is taken place and even regulated on-the-fly by feedback control. Some examples are described below with reference to FIGS. 2B-D.

Figure 2B:
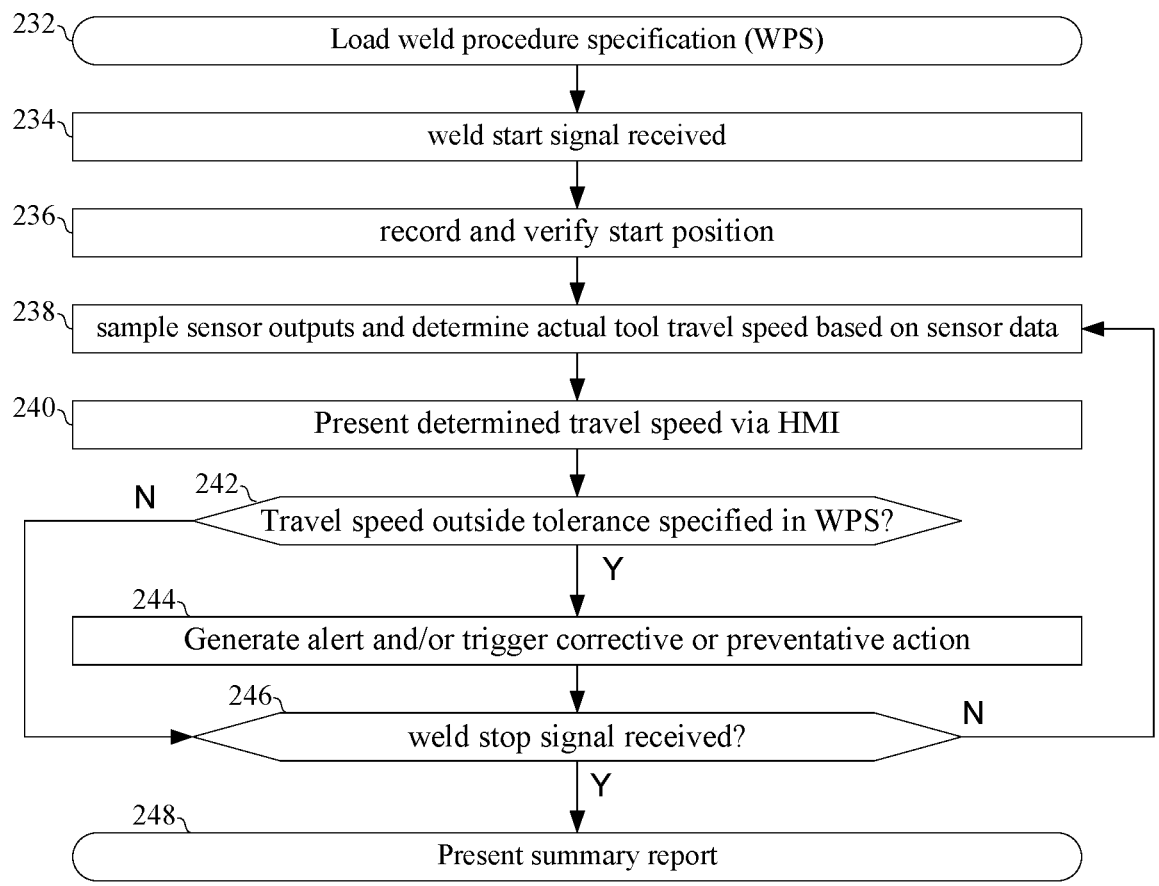
FIG. 2B is a flowchart illustrating closed loop control of travel speed of the manually operated tool of FIG. 1A.

FIG. 2B is a flowchart illustrating closed loop control of travel speed of the manually operated tool of FIG. 1A. The process begins in block 232 in which the processing subsystem 150 loads the WPS for a weld procedure to be performed. This may comprise, for example, retrieving the WPS from a remote database in response to the weld operator selecting the particular WPS (e.g., via the HMI of the processing subsystem 150, or a QR code on the workpiece automatically scanned by the tool). The WPS may comprise, for example, minimum and maximum travel speed (and/or heat input and/or cooling rate and/or weld size) thresholds which are then loaded into volatile memory such that the CPU can quickly perform comparisons against these thresholds.

In block 234, the processing subsystem 150 receives a signal that an arc has been ignited between the torch 102 and workpiece 108. For example, the weld start is originated from operator pulling a trigger of the torch 102. Before the weld energy is delivered to the torch 102, the actual torch position determined from output of the sensor(s) 106 is compared with the desired position of the next weld to be performed in the weld sequence. If a proximity threshold is met, the welding power is energized and welding is allowed to proceed. Otherwise, welding power supply output is turned off and a warning indicator is given to the operator via HMI that the operator is attempting to, for example, weld out of sequence or put a weld in a position not called out in the WPS. Thus compliance to the WPS is enforced.

In bock 236, in response to the weld start signal in block 234, the processing subsystem stores the weld start time, the output(s) of the sensor(s) 106 at the start time, and the position of the arc at the start time (e.g., referenced to a three-dimensional coordinate system determined during initial calibration of the torch 102 as, for example, described below with reference to FIGS. 3B and 3C).

In block 238, as the torch 102 proceeds along the path during the weld operation, the outputs of the sensor(s) 106 (e.g., accelerometer output, gyroscope output, magnetometer output, weld voltage sensor output, and weld current sensor output) are sampled and used to determine the torch travel speed. The determination of actual torch travel speed may be as described above with reference to block 212 of FIG. 2A. Likewise, torch angle, travel angle, weld position, heat input, cooling rate and weld size may be determined in block 238.

In block 240 the determined travel speed is presented via a HMI such that the operator performing the weld, or another person supervising the weld, gets real-time feedback about the weld.

In block 242, the determined travel speed is compared to the thresholds from the WPS. If the travel speed is between the thresholds, the process advances to block 246. If the travel speed is above the high threshold or below the low threshold ("out of spec"), the process advances to block 244.

In block 244, the torch operator is alerted via the HMI. The alert may comprise, for example, a flashing light or screen, an audible alarm, and/or graphics/animation/video/etc. instructing the operator to speed up, slow down, and/or perform some other corrective maneuver. Block 244 may additional comprise the processing subsystem 150 generating a control signal to trigger corrective action in an attempt to compensate for the out-of-spec travel speed. For example, the processing subsystem 150 may generate a control signal to adaptively control the welding power level and/or wire deposition rate so that the proper amount of heat input or weld size is maintained to compensate for the variations in the actual travel speed measured by the sensor(s) 106 (e.g., adjust the welding power source and/or wire feed speed) and/or to trigger preventative action (e.g., shutdown the power source so that the workpiece 108 is not damaged).

In block 246, if a weld stop signal has been received, then the process advances to block 248 in which a summary of the completed weld operation is presented via the HMI and/or stored to a training and/or quality assurance database. If a weld stop signal has not been received, the process returns to block 238. In an example implementation, the summary may be saved in a database locally in the welding equipment or uploaded to the cloud or remote database.

Figure 2C:
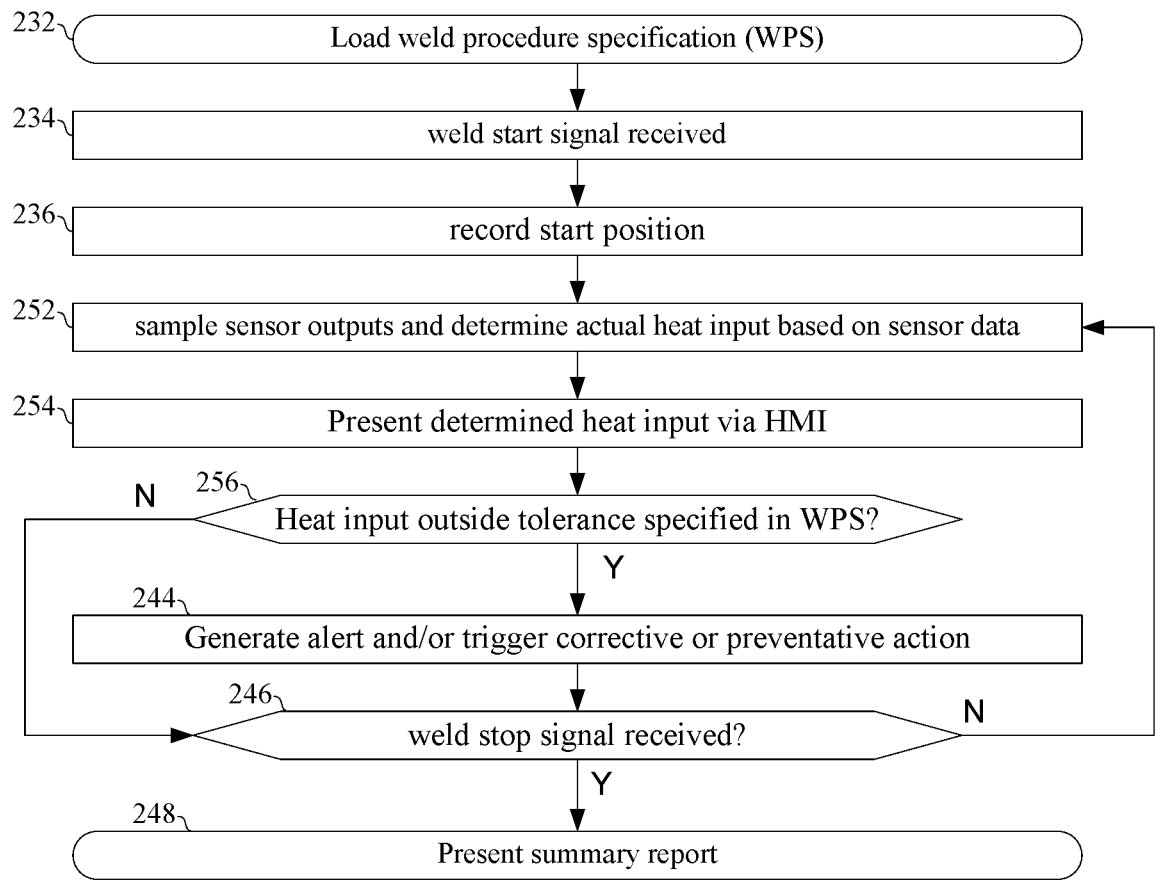
FIG. 2C is a flowchart illustrating closed loop control of heat input by manually operated welding torch.

FIG. 2C is a flowchart illustrating closed loop control of heat input by manually operated welding torch. The flowchart of FIG. 2C is substantially similar to the flowchart of FIG. 2B, with the exception that actual heat input (e.g., determined as described above with reference to block 216 of FIG. 2A), rather than actual travel speed as in FIG. 2B, is monitored and used for controlling the welding equipment and/or providing feedback to an operator. Too much heat input may cause workpiece burn-thru and too little heat input may cause lack of fusion. Heat input relates to weld depth or penetration. To compensate for operator travel speed variation and maintain proper heat input, corrective action in 244 may include increasing wire speed (in GMAW welding) or welding current (in GTAW welding) to match with an increased actual travel speed; and decrease wire speed or welding current to match with a decreased actual travel speed.

Figure 2D:
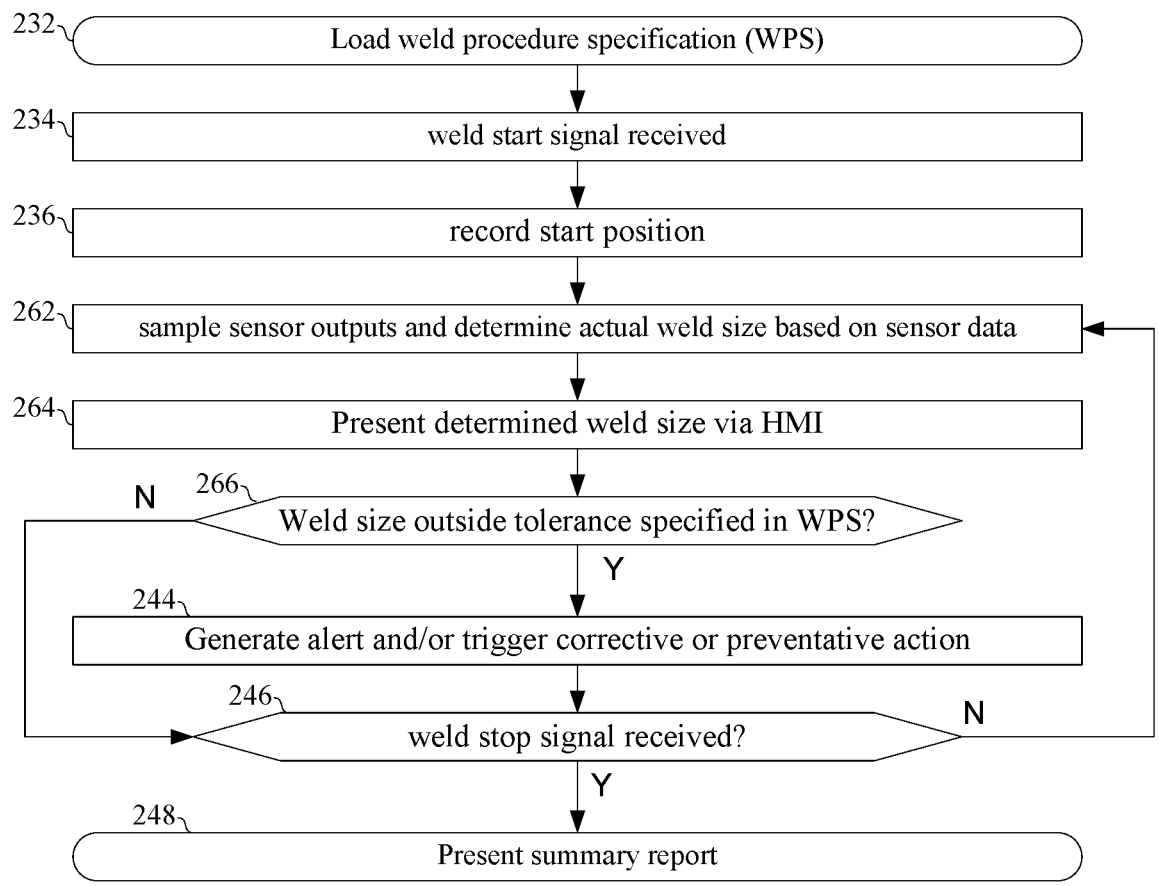
FIG. 2D is a flowchart illustrating closed loop control of the size of a weld being made by a manually operated welding torch.
Figure 2E:
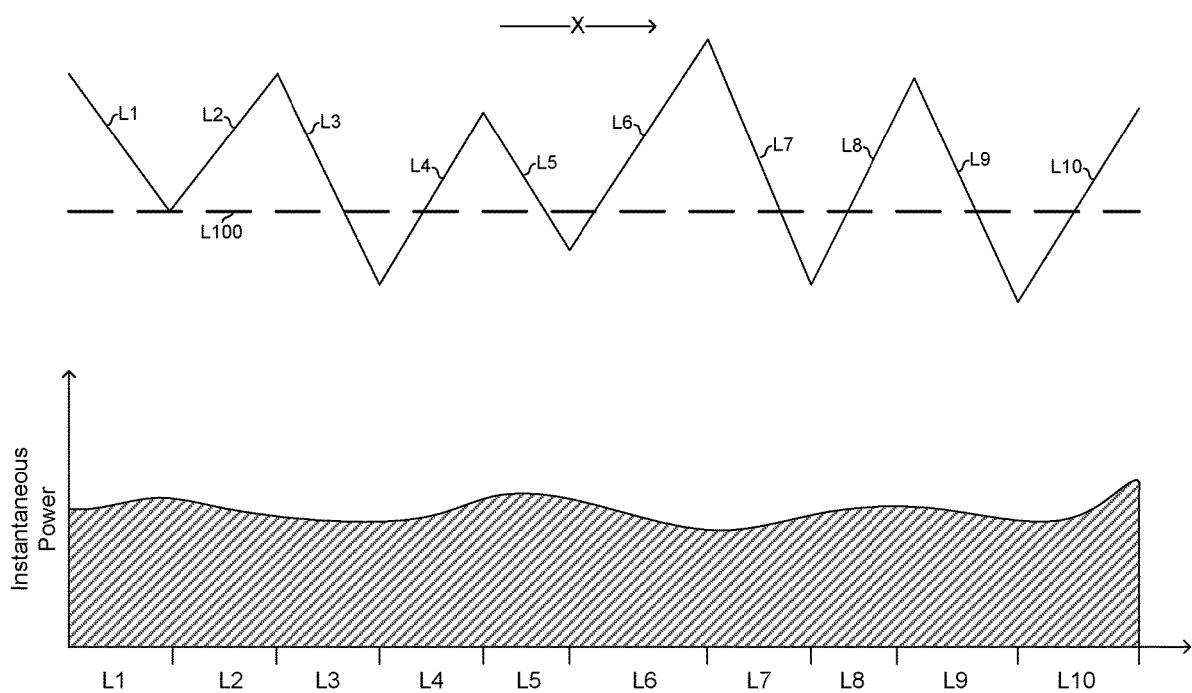
FIG. 2E illustrates an example weld made with a weaving pattern.

FIG. 2D is a flowchart illustrating closed loop control of heat input by manually operated welding torch. The flowchart of FIG. 2D is substantially similar to the flowchart of FIG. 2B, with the exception that actual weld size (e.g., determined as described above with reference to block 216 of FIG. 2A), rather than actual travel speed as in FIG. 2B, is monitored and used for controlling the welding equipment and/or providing feedback to an operator. More specifically, weld width (e.g. fillet leg length) may be maintained. For example, an inexperienced or less conscientious weld operator may have a tendency to "over weld" thinking mistakenly that bigger weld is always better without considering the large cost of distortion compliance post welding. To enforce proper weld size, the actual travel speed may be monitored in 262 and weld size (e.g. fillet leg length as function of the square-root of the heat input) may be calculated on-the-fly. If the actual speed is too slow, resulting in an over-sized fillet leg length, wire speed may be automatically slowed down in 244 so less metal is deposited down to match with the slower actual travel speed. During this adaptive welding, minimum travel speed may be checked also (as in FIG. 2B) but for a wider window of adaptability to tolerate wider skill gap of available operators.

Figure 3A:
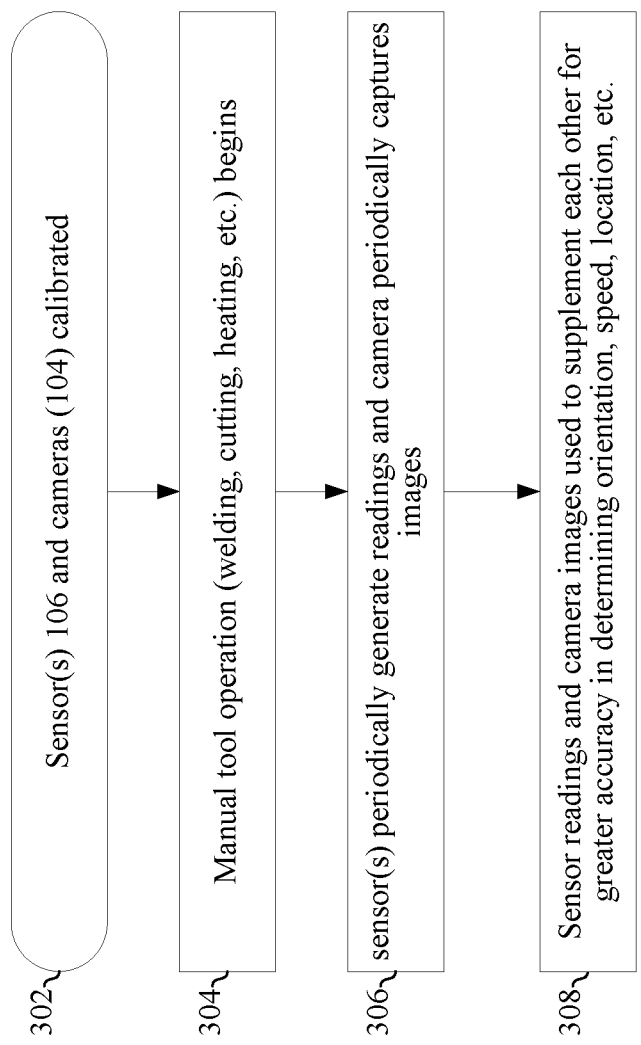
FIG. 3A is a flowchart illustrating tracking and guidance of a manual tool using both one or more inertial sensors and one or more cameras.

FIG. 3A is a flowchart illustrating tracking and guidance of a manual tool using both one or more inertial sensors and one or more cameras.

In block 302, the sensor(s) 106 and camera 104 are calibrated using, for example, a manual calibration method such as described below with reference to FIG. 3B.

In block 304, the manual tool operation begins. For example, where tool 102 is a welder, an operator may begin welding the joint along path 112. As another example, where tool 102 is a cutter (e.g., plasma cutter or saw), the operator may begin cutting along the path 112.

In block 306, the sensor(s) 106 periodically output readings and the cameras (106 and/or 104) periodically capture images during the manual tool operation. The readings from sensor(s) and camera(s) may be taken at the same time or separately in time and/or space The readings and images may be stored to memory for further processing.

In block 308, the readings from the sensor(s) 106 and the images from the camera(s) 104 are used in complement to each other for determining orientation, speed, location, and/or other motion data or attributes of the tool 102 with higher accuracy than may be achieved with sensor(s) 106 alone or camera(s) 104 alone. Orientation, speed, location, and/or other motion data or attributes may be determined using a heuristic approach. Orientation, speed, location, and/or other motion data or attributes may be determined based on a weighted combination of motion data or attributes determined from the images of camera(s) 104 and motion data or attributes determined from the readings of sensor(s) 106. At times when camera(s) 104 has/have a good view, data from the camera(s) 104 may weigh more heavily (and the sensors less heavily), into the final determined motion data or attributes. When the camera(s) 104 do(es) not have a good view, data from the camera(s) may weigh less heavily (and the sensors more heavily), into the final determined motion data or attributes. Additionally, or alternatively, because the sensor(s) 106 may be subject to drift over time, images from the camera(s) 104 when the view is good may be used for recalibrating the sensor(s) 106. In this regard, in an example implementation, one or more camera 104 may positioned/configured such that it can track the sensor(s) 106 in addition to (or instead of) tracking the tool 102 and workpiece 108. In this regard, in some instances the arrangement of the tool 102, workpiece 108, and sensor(s) 106 may be such that it is easier to maintain a good view of the sensor(s) 106 than it is to maintain a good view of the tool 102 (e.g., of the welding electrode or cutting tip) and the workpiece 108.

In an example implementation, the camera(s) 104 capture infrared wavelengths and are operable to measure the temperature of objects in their field of vision. This temperature gradient map may be processed to determine actual torch travel speed, as described below with reference to FIG. 3. In an example implementation, the temperature measured very close to the sensor(S) 106 may be used to compensate temperature drift of the sensor(s) 106 or data processing/transmission hardware. Additionally, or alternatively, the temperature sensor(s) 106 may comprise a temperature sensor (as shown in FIG. 1B) used to compensate for drift over temperature.

Figure 3B:
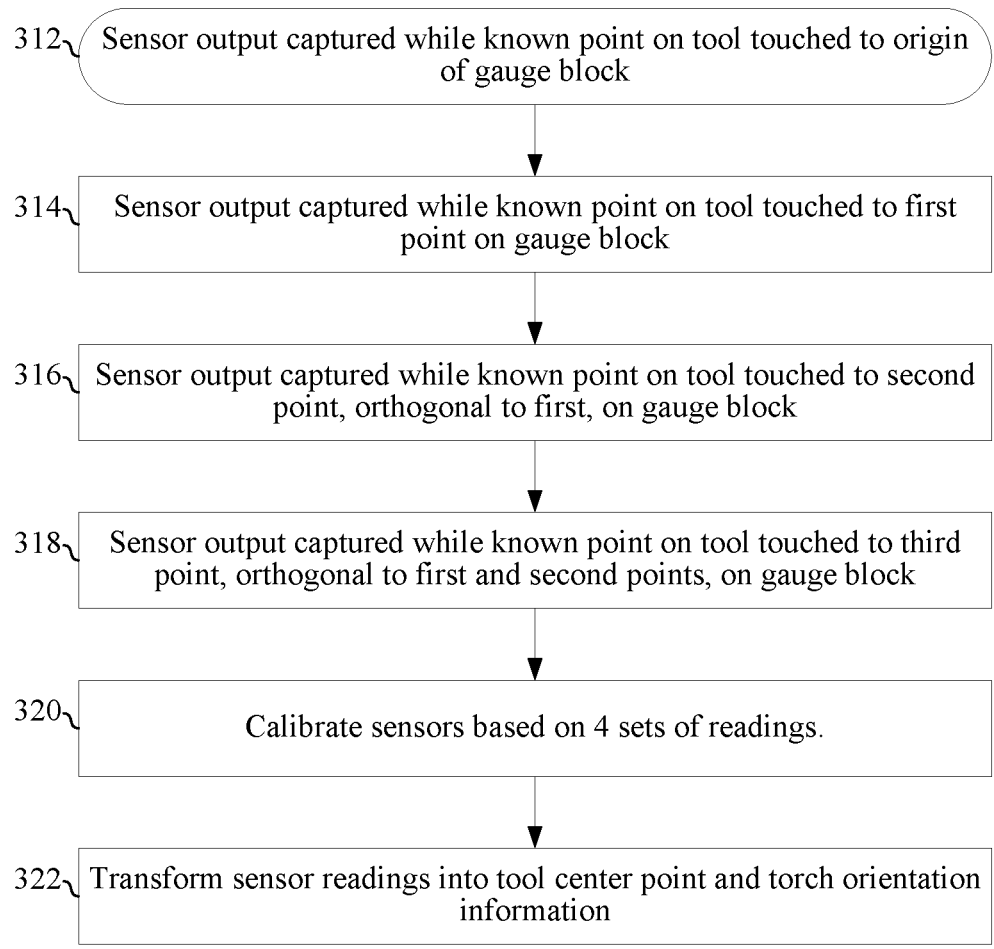
FIG. 3B is a flowchart illustrating an example method of calibrating an inertial sensor.

FIG. 3B is a flowchart illustrating an example method of calibrating an inertial sensor. In an example implementation, the goal of the calibration is to find the origin of the frame ("user frame" or "task frame"), relative to a work fixture and zero out accumulated drift by placing the tool in a known position and known orientation relative to weld fixture; and in known stationary state. In an example welding implementation, a fixed stick-out electrode itself (or a pointer at the end of the torch) may point to the tool center point (TCP) and be used to touch known points on a calibration block (jo block or gauge block built in the fixture). The processing subsystem 150 stores the output from sensor(s) 106 when the torch 102 is at these positions. In block 312, the tool is touched to the origin of the jo block, and a command (e.g., trigger pull, button press, voice command, or automatically by proximity sensors), is given to record the origin. Then, in blocks 314-318, the tool is moved to, for example, three other known parts of the jo block and orthogonal points (position and orientation) are recorded. In block 320, the sensor(s) 106 are calibrated based on the four sets of readings from the four points of the jo block. In block 322, the processing subsystem 150 performs frame transformation to take the sensor position information and turn them into the TCP position and torch orientation.

Figure 3C:
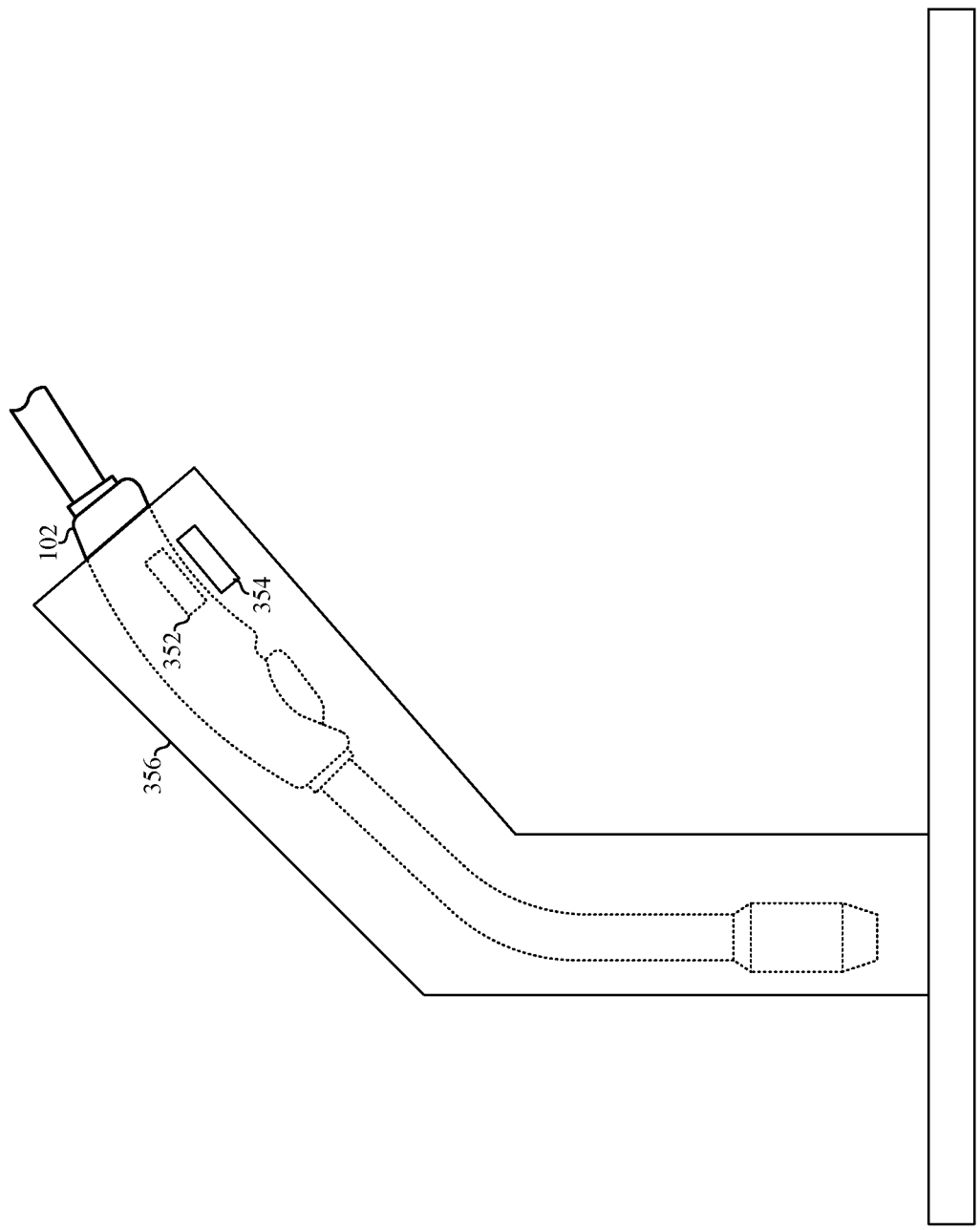
FIG. 3C depicts an example fixture for calibration of one or more sensors integrated in/on a manual tool.

FIG. 3C depicts an example fixture for calibration of one or more sensors integrated in/on a manual tool. The fixture (e.g., in a manufacturing facility or a portable fixture that can be taken into the field) comprises a holster 356 that positions the tool 102 (a welding torch in the example shown) in a known home position and orientation. The holster 356 may have proximity or other sensor(s) 354 (the tool 102 may have corresponding sensing element 352 e.g. ferromagnetic material block for proximity sensor 354, which may be part of sensors 106) so that the system knows when torch is placed securely and completely inside the holster 356 such that accurate calibration of sensors 106 can be performed automatically. Once calibrated, the sensor(s) 106 can be used to determine the orientation of the tool 102 and/or the position of the tool in 3D space relative to the fixture.

Figure 3D:
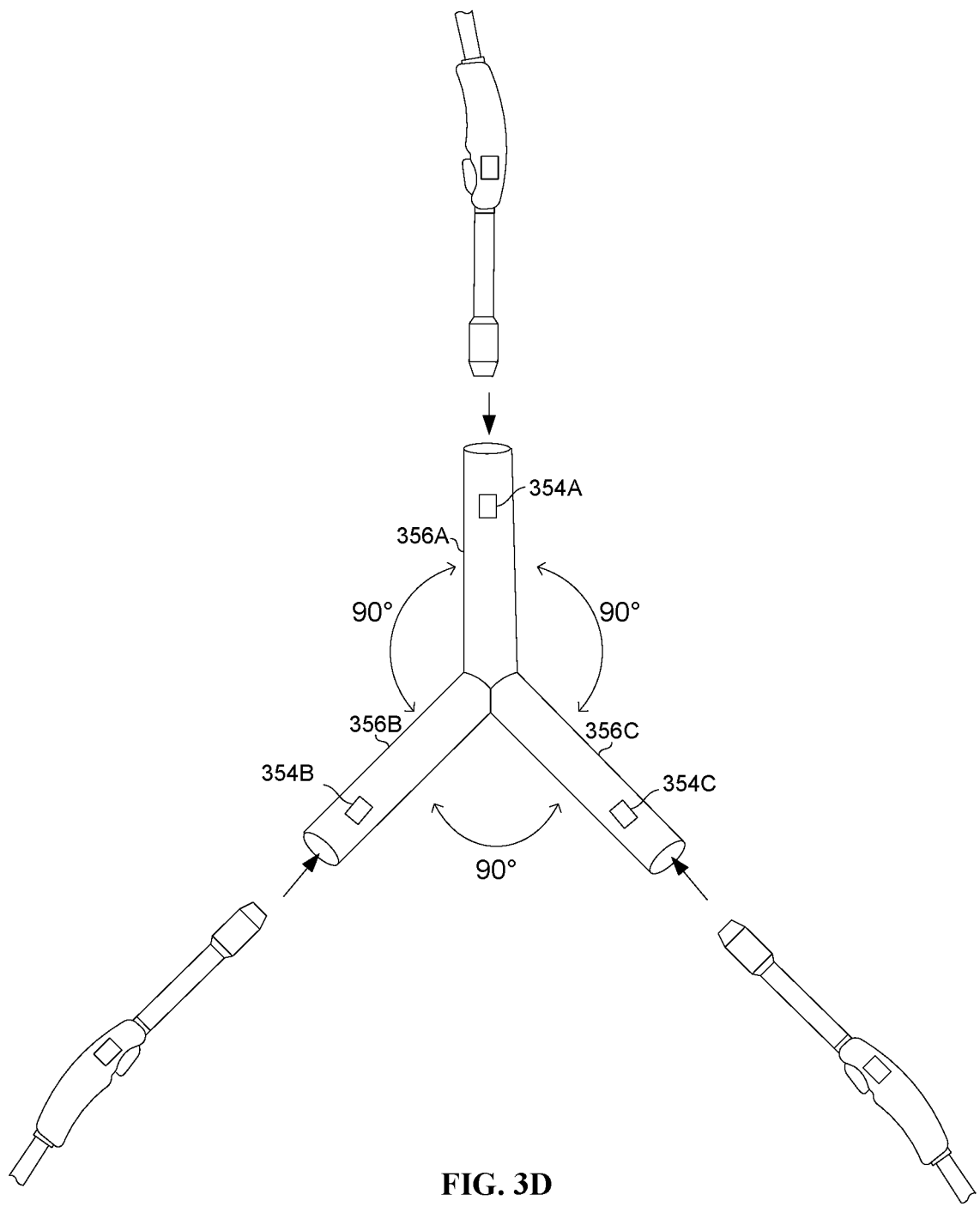
FIG. 3D depicts an example calibration apparatus.

In an example implementation, as shown in FIG. 3D, multiple holsters 356A, 356B, 356C with different locations and/or orientations are mounted to the fixture for accurate calibration (e.g., the three holsters are each 90° apart as shown). The calibration holders may be geometrically fixed with respect to the fixture, workpiece and joint so that the user/task frame can be established. For calibration, the operator may be guided by an HMI to place the torch 102 sequentially in the three holsters. An example implementation is described next.

First, an LED on holster 356A may flash indicating that the operator is to insert the torch 102 into holster 356A. When the torch 102 is inserted into holster 356A, and the proximity sensor 354A detects that the torch 102 is fully inserted, the processing subsystem 150 records the sensor output. Then, an LED on holster 356B flashes prompting the operator to insert the torch into 356B. When the torch 102 is inserted into holster 356B, and the proximity sensor 354B detects that the torch 102 is fully inserted, the processing subsystem 150 records the sensor output. Finally, an LED on holster 356C flashes prompting the operator to insert the torch into 356C. When the torch 102 is inserted into holster 356C, and the proximity sensor 354C detects that the torch 102 is fully inserted, the processing subsystem 150 records the sensor output. After the sensor output has been recorded for each of the holsters 356A-356C, the processing subsystem 150 can accurately determine the user/task frame. In another example implementation, instead of holsters, a calibration apparatus may comprise pegs, brackets, clamps, and/or any other suitable apparatus for holding the torch still in a known position and orientation.

Figure 4:
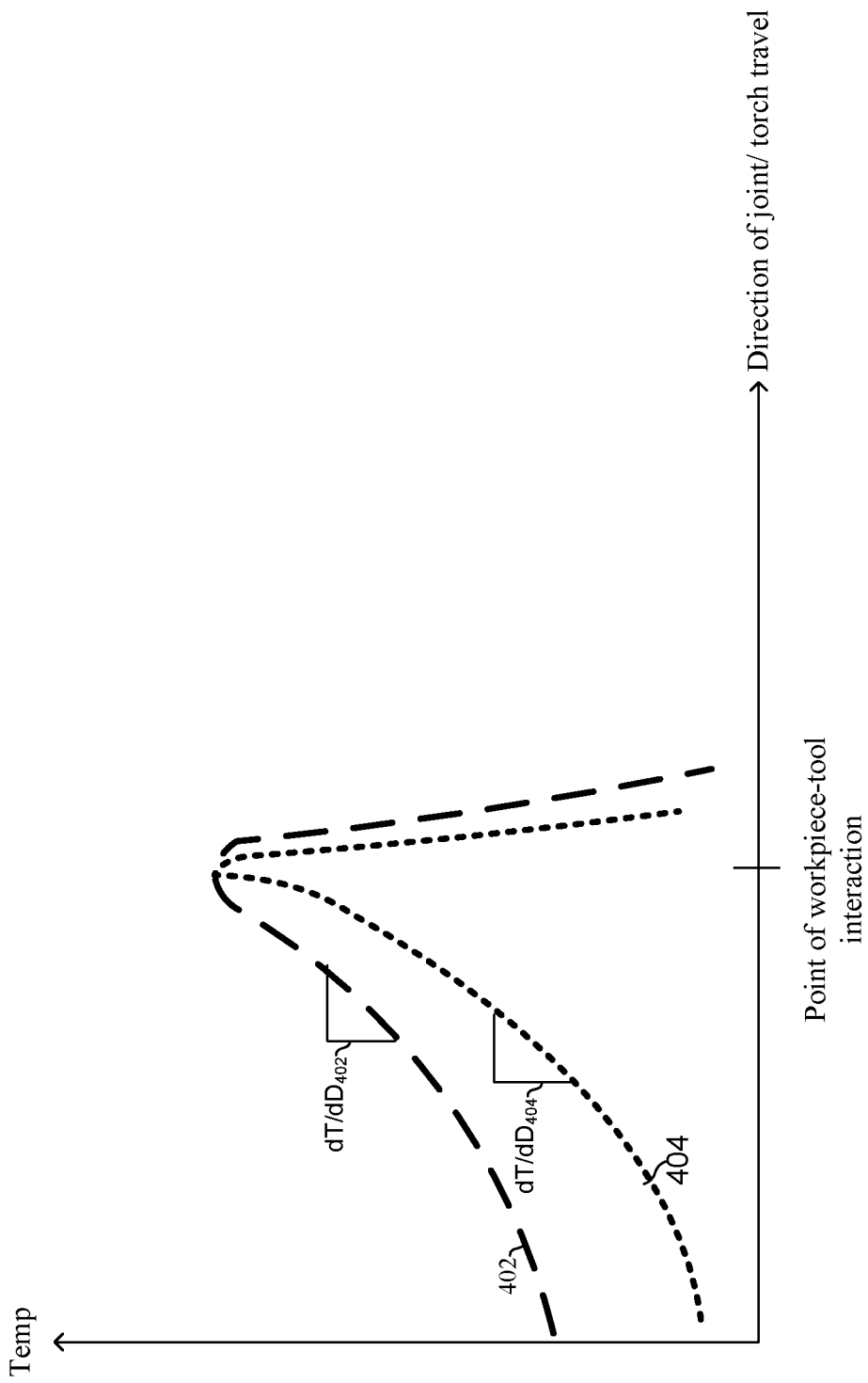
FIG. 4 illustrates determination of speed of a manual welder or cutting torch using one or more inertial sensors and a temperature sensor

FIG. 4 illustrates determination of speed of a manual welder or heating or cutting torch using one or more inertial sensors and a temperature sensor. In an example implementation, camera 104 is an infrared cameras operable to measure the temperature of objects in their field of vision. For various types of tool 102 (e.g., welding torches, plasma cutters, induction heaters, and even blade saws) the temperature of the workpiece will be highest at the point where the tool 102 is currently interacting with the workpiece (i.e., the location of the arc, the blade, etc.) and decay in directions away from that point. FIG. 4 shows a graph where the vertical axis represents temperature and the horizontal axis represents the direction of travel of the tool 102. The direction of travel may, for example, be determined from readings of an accelerometer of the sensor(s) 106. Marked on the horizontal axis is the point at which the tool 102 is currently interacting with (welding, heating, cutting, etc.) the workpiece 108. Thus, the shape of the temperature gradient, combined with direction information determined from the accelerometer, provides information about the speed of the tool 102. For example, line 402 represents a slower moving tool 102, whereas line 404 represents a faster moving tool 102. Thus, properties of the temperature gradient (e.g., dT/dD at one or more points in front of and/or behind the point of interaction, where T is temp, D is distance) may be used for determining speed of the tool 102. Once the speed is determined, it can be compared with a desired speed (e.g., set forth in a weld procedure specification) and the operator of the manual tool 102 can be guided (e.g., using visual, audible, and/or tactile feedback) to speed up or slow down, as appropriate Closed loop control of welding parameters may be possible to adapt to travel speed variation to maintain heat input, weld size, cooling rate etc.

Figure 5A:
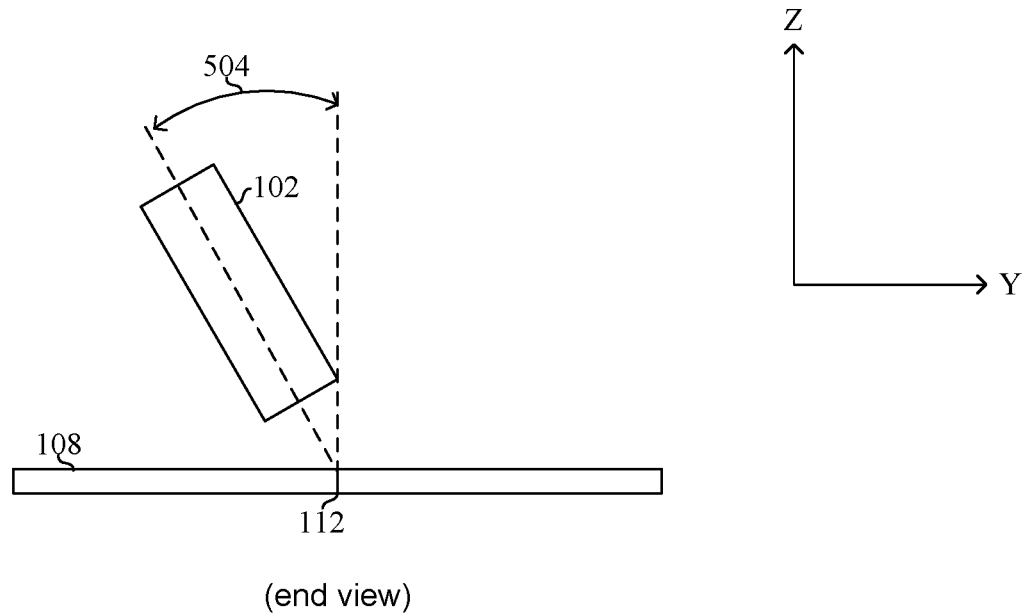
FIGS. 5A and 5B illustrate work angle and travel angle of a manual tool.
Figure 5B:
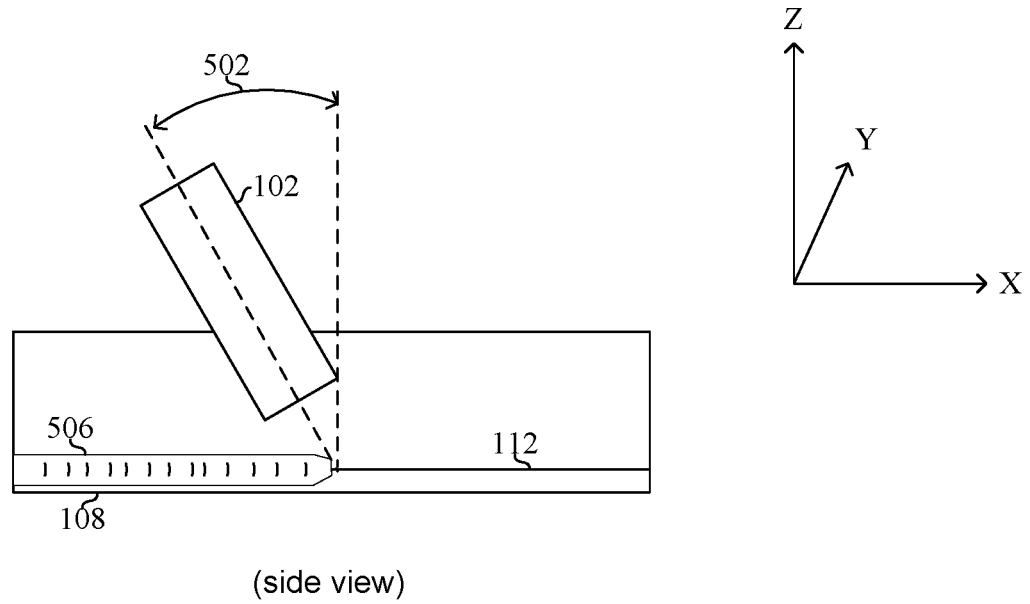
Figure 5C:
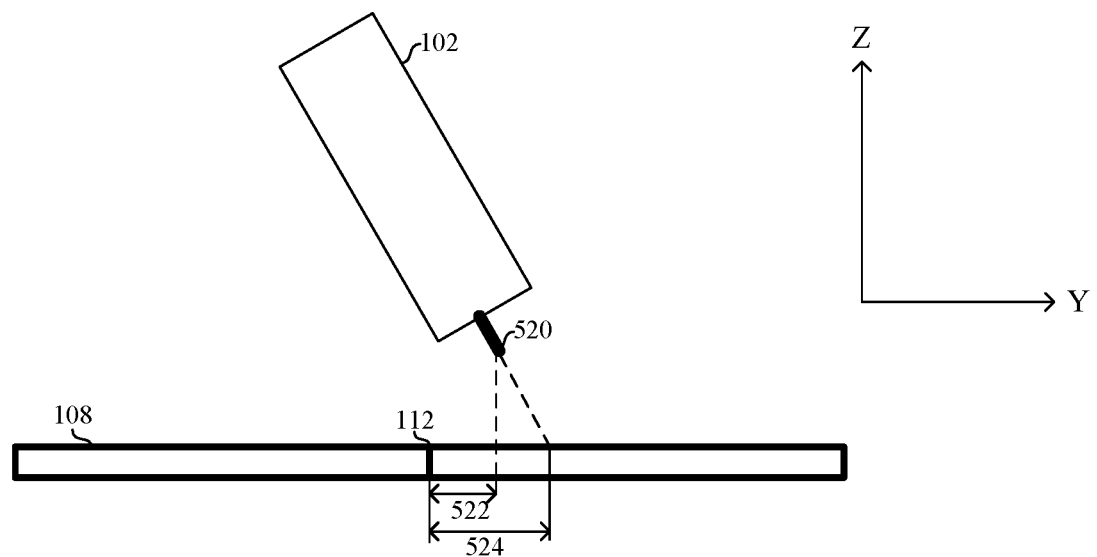
FIG. 5C illustrates tool-to-work distance.

During the welding operation, a position and orientation of the tool 102 may be defined by parameters including: a travel angle 502, a work angle 504, a travel speed, aim, and tool-to-work distance. Assuming a direction of travel of the tool 102 to be in the X direction, FIG. 5A illustrates the work angle 504 of the tool 102 and FIG. 5B illustrates the travel angle 502 (for the example of a weld torch, the bead being laid down is called out at 506). The travel speed is the speed at which the tool 102 (or, more specifically, the arc/blade/etc. controlled by the tool 102) moves along the path 112. The aim of the tool 102 is a measure of the position of the tip of the tool (e.g., non-consumable electrode or contact tip of a welding torch, nozzle of a plasma cutter, blade of a saw, etc.) with respect to the path 112 to be followed. Aim may be measured, for example, as distance from the center of the path 112 in a direction perpendicular to the direction of travel. Aim may be measured relative to the projection of the tip of the tool 102, as shown by measurement 524 in FIG. 5C, and/or may be measured relative to the orthogonal projection of the tip, as shown by measurement 522 in FIG. 5C.

Figure 5D:
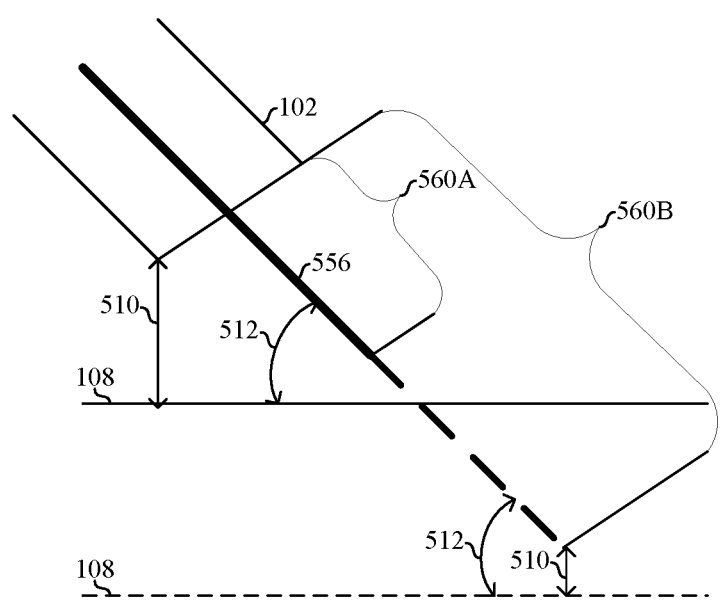
FIG. 5D illustrates stick-out distance for a manual tool.

Tool-to-work distance, as used here, is the orthogonal distance 510 between a tool (e.g., electrode or contact tip of a welding torch, nozzle of a plasma cutter or oxy fuel heater, shoe of a saw, etc.) and the surface of workpiece 108 at or near the point that the tool 102 is interacting with the workpiece, as illustrated in FIG. 5D. Stick-out distance for a GMAW welding torch is a measure of how far a wire extends from the contact tip of tool 102. FIG. 5D shows two stick-out distances for a wire 556. The first stick-out distance 560A is shown in solid lines and the second stick-out 560B is shown in dashed lines. The angle 512 shown in FIG. 4D may be the work angle or the travel angle, depending on the direction of travel and the direction from which the torch is pictured.

Figure 6:
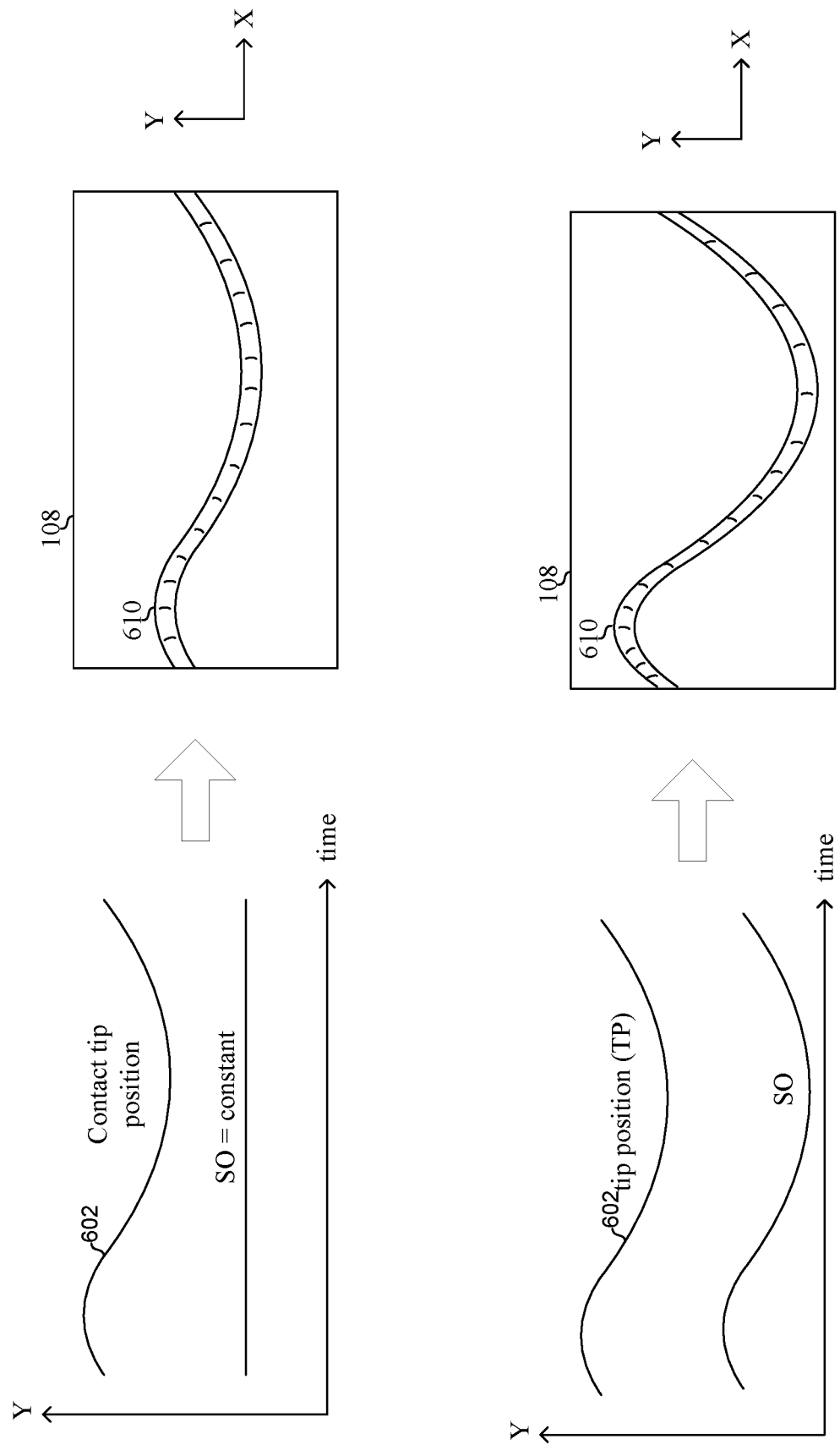
FIG. 6 illustrates locating a weld path based on tool stick-out distance and tool-to-work distance.

For GMAW welding, the wire 556 exits the contact tip of tool 102 but the wire stick out length is variable. At the end of the wire is the arc which does the majority of the melting. Thus, to accurately track the weld bead, it is important to know the position of the arc, which requires accounting for actual stick-out distance and/or wire-to-work distance (or arc length). In this regard, tracking location of the tool center point may not be sufficient for accurately tracking the actual path cut/welded/etc. by the tool 102. Using a welding torch as an example, the top half of FIG. 6 shows that with a constant stick-out distance ("SO"), position of the arc 610 in the Y direction tracks position of the contact tip 602 in the Y direction. The absolute position of the arc 610 in the Y direction, however, requires knowledge of the stick-out distance, the work angle, and the travel angle, as can be seen from FIG. 5D. In fact, as shown in the bottom half of FIG. 6, by adding stick-out length measure obtained via thru-the-arc signals to the position of contact tip 602, work angle ($\varphi_1$), and travel angle ($\varphi_2$) obtained via the sensor(s), movement of the tool center point in the Y direction may be compensated for such that the resulting arc 110 movement is more accurate (e.g., an amplified curve in the example in the bottom half of FIG. 6).

Figure 7:
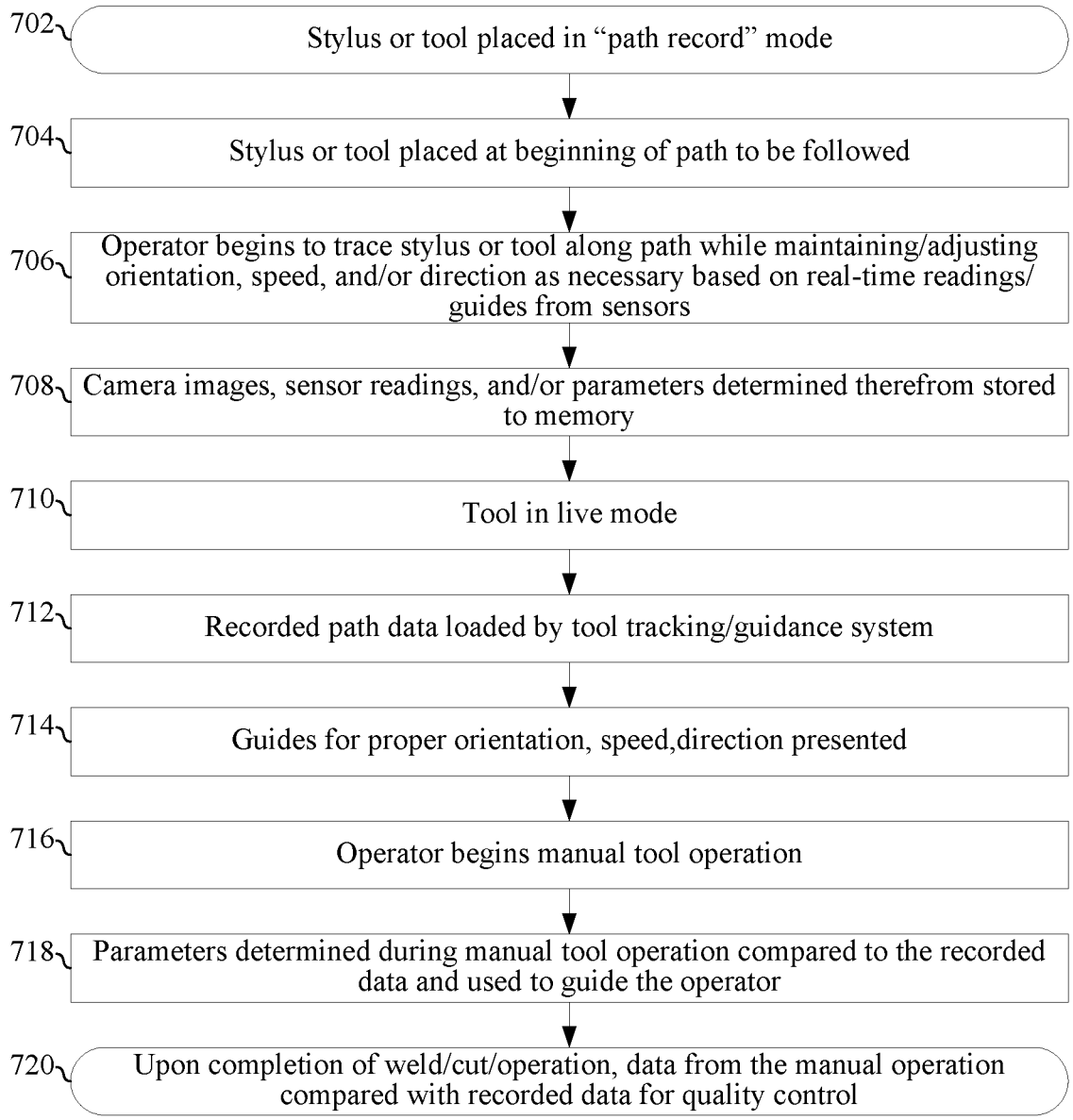
FIG. 7 is a flowchart illustrating an example method for electronic guidance of a manual tool.

FIG. 7 is a flowchart illustrating an example method for electronic guidance of a manual tool. In block 702, the tool, or a proxy for the tool such as a stylus having sensors 106, is placed in a "path record" mode. In block 704, the stylus or tool is placed at the beginning of the path 112. In block 706, the operator begins to trace the path 112 using the stylus or tool in "record path" mode while maintaining motion attributes (e.g., orientation, speed, direction, tool-to-work distance, and/or the like) as dictated by the WPS for the work to be performed along path 112. During the tracing, motion attributes such as orientation, position, speed, and/or the like may be determined based on output from the camera(s) 104 and/or sensor(s) 106. The processing subsystem 150 may provide real-time feedback (e.g., visual, audible, and/or tactile) of the motion attributes during path recording to enable the operator to maintain the appropriate motion attributes while tracing the path 112. In block 708, the determined motion attributes are stored to memory. The raw data from the camera(s) 104 and/or sensor(s) 106 may also be stored along with the motion attributes. In block 710, the tool is placed in live mode (or the stylus is swapped out for the tool 102). In block 712, the recorded path information is loaded by the processing subsystem 150 such that the system is ready to guide an operator or robot to repeat the taught path and attributes. In block 714, the system may initialize a user interface for guiding the operator. For example, the system may bring up a near-eye display or augmented reality display inside a mask of the operator and/or on a monitor viewable by the operator as, for example, described below with reference to FIGS. 8A and 8B. A user interface could be light projection in the work cell for example in the ceiling above the workpiece or in the helmet worn by operator. In block 716, the operator begins the manual tool operation (e.g., welding, cutting, heating, nailing, gluing, grinding, or the like). In block 718, motion data or attributes determined from readings of the sensor(s) 106 and/or images from camera(s) 104 during the live manual tool operation are compared against the recorded motion data or attributes. The system may provide audio, visual, and or tactile feedback to guide the operator toward the recorded path. For example, if the work angle gets too large or too small the system may guide the operator back to the appropriate work angle with a visual, audio, and/or tactile cue. As another example, if the speed of the tool gets too fast or two slow the system may guide the operator back to the appropriate speed with a visual, audio, and/or tactile cue. In block 720, upon completion of the live manual tool operation, data from the live manual tool operation may be compared with the recorded data for quality control purposes.

In an example implementation, the tracing may be performed by an instructor and the subsequent live manual operation may be performed by a student. The instructor may be able to monitor the live operation for assessing the student's skill. The real-time feedback information may enable to the instructor to continually assess the tool orientation, position, speed, etc. even when the tool is out of his/her line of sight (e.g., on 360° pipe welding or cutting, corner welds or cuts, etc.

In an example implementation, path recording may comprise multiple passes along the path. For example, a first pass may trace along the entire path for locating the path, and a second pass may comprise placing the stylus or tool waypoints along the path and setting the proper orientation at those waypoints.

Figure 8A:
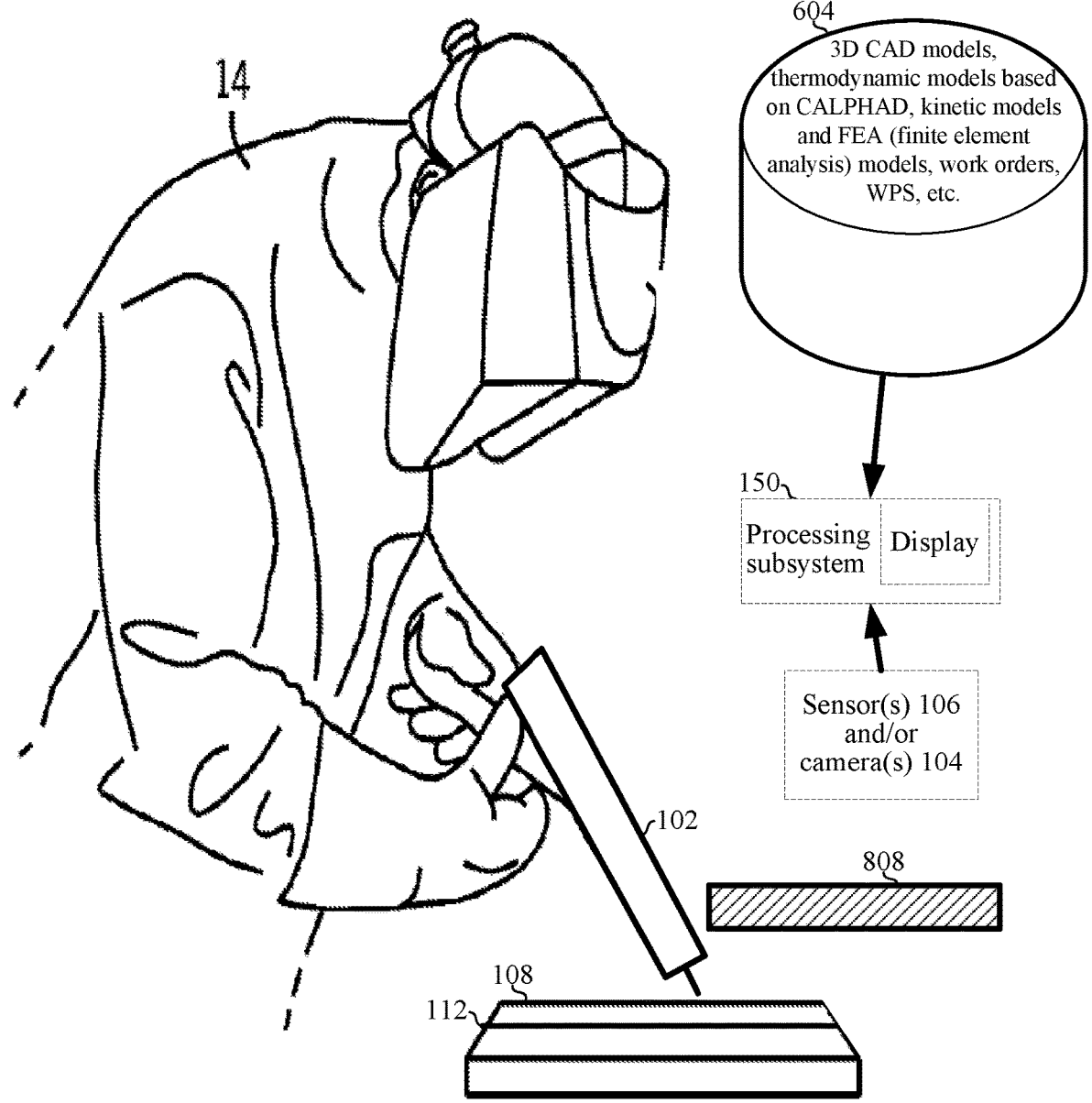
FIGS. 8A and 8B illustrate visual guidance of manual tool operation.
Figure 8B:
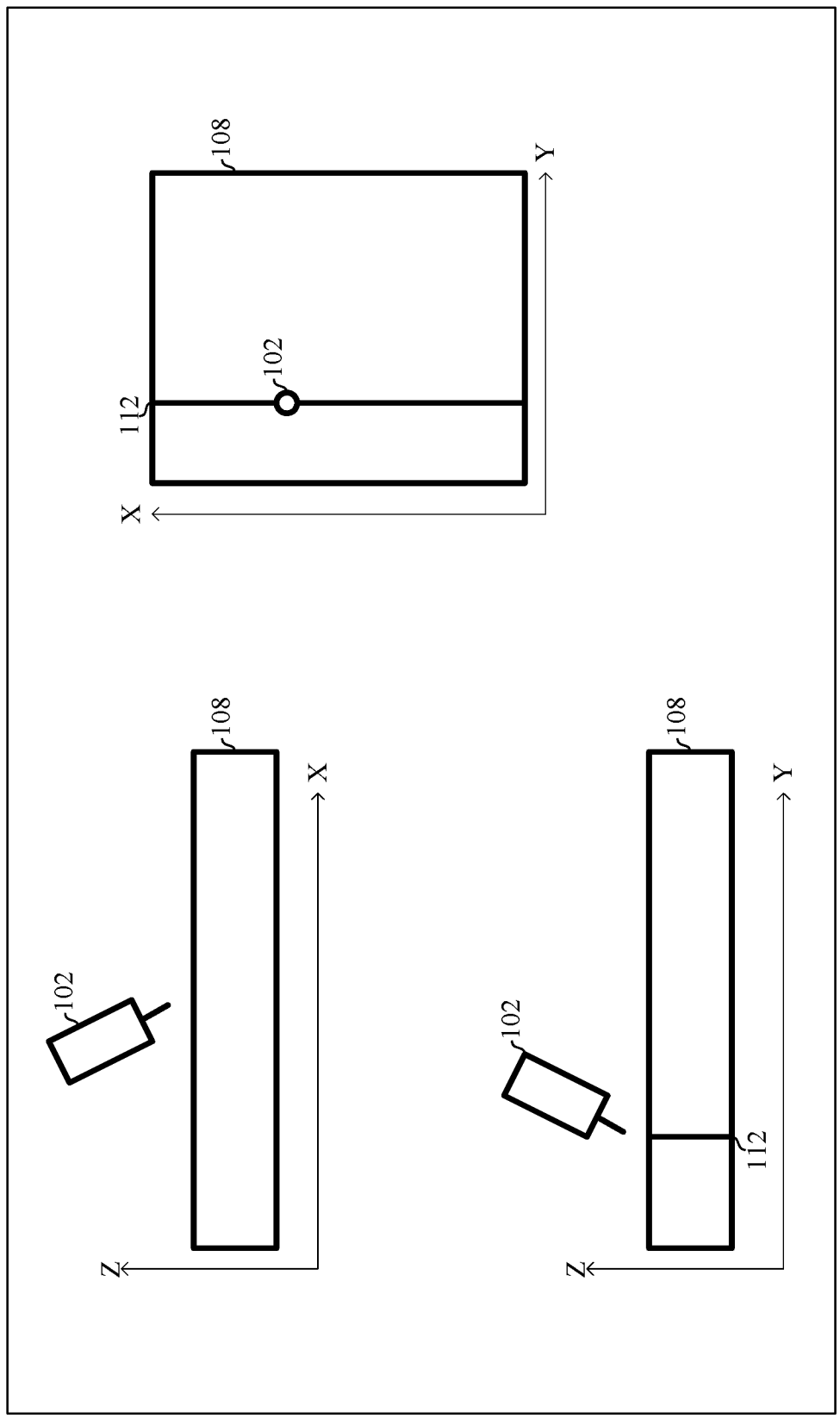

FIGS. 8A and 8B illustrate a method and system for visual guidance of manual tool operation. Shown in FIG. 8A is an operator 14 performing a manual tool operation with tool 102 on workpiece 108. There is an obstruction 808 blocking the operator's view of at least part of the path 112 along which the tool 102 is to pass. Accordingly, the sensor(s) 106 and/or camera(s) 104 may determine position and orientation of the tool 102 relative to the path 112. The position and orientation determined from sensor(s) 106 and camera(s) 104 may be provided to processing subsystem 150 which may render a real-time visualization of the position and orientation of the tool 102 relative to the workpiece 108. For example, a rendering of the tool 102 (or a portion thereof such as the electrode of a welding torch, the nozzle of a plasma cutter, the blade of a saw, etc.) in its current position and orientation may be overlaid on a representation of the workpiece 108. The representation of the workpiece 108 may be a live image from the camera(s) 104 if the camera(s) 104 can capture an adequate image of the workpiece 108 and tool 102. The representation of the workpiece 108 may be a 3D rendering (e.g., pulled from a 3D CAD model file in database 804) when the camera(s) 104 cannot capture an adequate image of the workpiece 108 and tool 102. In addition to, or instead of, rendering a visualization of the actual tool 102, visual indications (e.g., text, graphical meters, etc.) of various motion data or attributes (e.g., travel speed, work angle, travel angle, electrode aim/wire placement, etc.) may be presented on the display of processing subsystem 150 or projected onto the actual scene of the workpiece and the tool. In an example implementation, target values of the motion data or attributes (e.g., pulled from a WPS) stored in database 604 may also be displayed on the display of processing subsystem 150. Rendering and/or live images of weld operations occurring may be transmitted to remote viewing stations such that, for example, an inspector can inspect many weldments on a wholesale basis (e.g., inspect all welds in a factory from a central location). The database 604 may also store one or more of: thermodynamic models based on CALPHAD, kinetic models and FEA (finite element analysis) models, and/or the like for the workpiece 108.

FIG. 8B shows an example of what may be presented on the display of processing subsystem 150 during a manual tool operation. In the top left of FIG. 8B, there is shown a first point-of-view rendering of the current position and orientation of tool 102 and workpiece 108. This first point-of-view may, for example, allow the operator to see the current travel angle and travel speed. In the bottom left of FIG. 8B, there is shown a second point-of-view rendering of the current position and orientation of tool 102 and workpiece 108. This second point-of-view may, for example, allow the operator to see the current work angle. In the right half of FIG. 8B, there is shown a third point-of-view rendering of the current position and orientation of tool 102 and workpiece 108. This third point-of-view may, for example, allow the operator to see the current aim (e.g. wire placement).

In an example implementation, the motion data and attributes information determined from camera(s) 104 and sensor(s) 106 may be used in combination with CAD files of the workpiece 108 and/or specifications of work to be performed on the workpiece 108 to control an automatic lockout of the tool 102. Using this information, the system may be operable to detect when the tool is in a position/orientation/location in which it is unsafe or otherwise undesirable to allow the tool 102 to be activated (e.g., to energize the electrode of a welding torch, being spinning the blade of a saw, etc.). For example, tool 102 may be locked out in any of the following scenarios: the operator attempts to perform an out-of-sequence operation (weld, cut, nailing, etc.) on the workpiece 108; a sensor on the safety equipment (helmets, goggles, safety glasses, gloves, jackets, PAPRs, etc.) indicates that the safety equipment is not present or not in the correct position; the tool 102 is the wrong tool for the operation to be performed, the tool 102 is the right tool but set to the wrong settings for the operation to be performed, the tool 102 is in the wrong orientation, the tool 102 is too far from the path 112, etc.

In accordance with various example implementations of this disclosure, one or more motion attributes such as travel speed and/or weld length are determined from output of an IMU. The determined motion attribute(s) are then used for monitoring, and, in some instances, adaptively controlling one or more of: travel speed, travel angle, work angle, aim, weld sequence, weld location and position, heat input per unit length, penetration, weld size, cooling rate, and mechanical properties of the weld such as weld microstructure, hardness, defect, and discontinuity.

In accordance with an example implementation of this disclosure, a system comprises a hand-held weld tool (e.g., 102) comprising a positioning and orientation measurement system (e.g., 106, 150, and/or portions of either or both) having an inertial measurement unit (IMU), a processing subsystem (e.g., 150), an a calibration apparatus (e.g., 356). The processing subsystem is operable to compute, based on data generated by the IMU during a weld operation on a workpiece (e.g., 108), one or more actual motion attributes for the hand-held weld tool. The calibration apparatus is configured to hold the hand-held weld tool in a known position and orientation and in stationary state for calibration of the positioning and orientation measurement system. The calibration apparatus may comprise a sensor (e.g., 354) for detecting when the hand-held weld tool is properly positioned for calibration. The calibration apparatus may comprise three holsters (e.g., 356A-356C) orthogonally oriented in three-dimensional space.

In accordance with various example implementations, the system may also comprise a non-IMU sensor operable to generate data that comprises one or more of: values corresponding to welding voltage during the weld operation, values corresponding to current flowing from the hand-held weld tool during the weld operation, values corresponding to power delivered from the hand-held weld tool to the workpiece during the weld operation, and values corresponding to welding impedance (e.g., measured at a determine point along the current path from power source to workpiece) during the weld operation. The processing subsystem may be operable to compute time integrals and/or time derivatives (e.g., first and/or second derivatives) of one or more of these values. The non-IMU sensor may comprise a camera, and the processing subsystem may be operable to compensate for drift of the IMU based on images of the hand-held tool captured by the camera. The non-IMU sensor may comprise a positioning receiver, the processing subsystem may be operable to compensate for drift of the IMU based on data output by the positioning receiver. The non-IMU sensor may comprise an acoustic receiver, and the processing subsystem may be operable to compensate for drift of the IMU based on data output by the acoustic receiver. The non-IMU sensor may be a proximity sensor, and the processing subsystem may be operable to compensate for drift of the IMU based on data output when the torch is placed or moved near the proximity sensor at a known location relative to the weld fixture. The one or more actual motion attributes comprise actual travel speed and the processing subsystem may be operable to: process the data generated by the IMU to determine instantaneous travel speed of the hand-held weld tool at one or more time instants during the weld operation; average the instantaneous travel speed over an interval to determine the actual travel speed during the interval; and one or more of: provide a real-time visual and/or audible indication of the actual travel speed; store the actual travel speed to a database to which it is communicatively coupled; determine the weld length during the interval based on accumulation of the actual travel speed during the interval; and adaptively control, based on the actual travel speed, one or more of: heat input per unit length during the weld operation such that the heat input per unit length remains within determined thresholds (e.g., plus or minus 10% of target heat input) during the weld operation, weld size during the weld operation such that the weld size remains within determined thresholds (e.g., plus or minus 10% of target weld size) during the weld operation, cooling rate during the weld operation such that the cooling rate remains within determined thresholds (e.g., plus or minus 10% of target cooling rate) during the weld operation. The processing subsystem may be operable to compute, based on data generated by the IMU during a weld operation on a workpiece, actual weld length during the weld operation. The non-IMU sensor may be operable to measure instantaneous welding power, and the processing subsystem may be operable to: integrate instantaneous power over time to determine actual heat input; and determine the actual heat input per unit length by dividing the actual heat input by the actual weld length. The processing subsystem may be operable to provide a real-time visual and/or audible indication of the actual heat input. The processing subsystem is operable to adaptively control, based on the actual heat input, one or both of: power supplied by a welding power source during the weld operation, and a speed at which wire is fed by a wire feeder during the weld operation. The processing subsystem may be operable to store the actual heat input to a database to which it is communicatively coupled. The motion attribute may be one of: actual torch angle during the weld operation, actual travel angle during the weld operation, actual weld position relative to the workpiece during the weld operation, and actual weld location within the workpiece during the weld operation.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A system comprising:
   a hand-held weld tool comprising a positioning and orientation measurement system having an inertial measurement unit (IMU);
   a camera configured to capture images of the hand-held welding tool during a weld operation on a workpiece;
   a portable fixture, comprising:
      a holster configured to maintain the hand-held weld tool in a known position and orientation and in stationary state for calibration of the IMU; and
      a sensor configured to detect when the hand-held weld tool is properly positioned in the holster, such that the processing subsystem can accurately perform calibration of the IMU; and
   a processing subsystem configured to:
      determine, based on data generated by the IMU, a weld position of the weld operation; and
      compute, based on a weighted combination of the data generated by the IMU and data based on the images during the weld operation on the workpiece, one or more actual motion attributes for the hand-held weld tool.

2. The system of claim 1, comprising:
   a non-IMU sensor operable to generate data that comprises one or more of:
      values corresponding to welding voltage during the weld operation;
      values corresponding to current flowing from the hand-held weld tool during the weld operation;
      values corresponding to power delivered from the hand-held weld tool to the workpiece during the weld operation;
      values corresponding to welding impedance during the weld operation;
      values corresponding to arc duration; and
      values corresponding to total energy delivered to the weld.

3. The system of claim 2, wherein the processing subsystem is operable to compute one or more of time integrals or time derivatives, of one or more of:
   the values corresponding to the welding voltage during the weld operation;
   the values corresponding to the current flowing from the hand-held weld tool during the weld operation;
   the values corresponding to the power delivered from the hand-held weld tool to the workpiece during the weld operation; and
   the values corresponding to welding impedance during the weld operation.

4. The system of claim 1, wherein:
   the processing subsystem is operable to compensate for drift of the IMU based on the images of the hand-held tool captured by the camera.

5. The system of claim 1, comprising a non-IMU sensor, wherein:
   the non-IMU sensor is a positioning receiver; and
   the processing subsystem is operable to compensate for drift of the IMU based on data output by the positioning receiver.

6. The system of claim 1, comprising a non-IMU sensor, wherein:
   the non-IMU sensor is an acoustic receiver; and
   the processing subsystem is operable to compensate for drift of the IMU based on data output by the acoustic receiver.

7. The system of claim 1, comprising a non-IMU sensor, wherein:
   the non-IMU sensor is a proximity sensor; and
   the processing subsystem is operable to compensate for drift of the IMU based on data output by the proximity sensor when the torch is placed or moved near the proximity sensor at a known location relative to the weld fixture.

8. The system of claim 1, wherein the one or more actual motion attributes comprise actual travel speed and the processing subsystem is operable to:
   process the data generated by the IMU to determine instantaneous travel speed of the hand-held weld tool at one or more time instants during the weld operation;
   average the instantaneous travel speed over an interval to determine the actual travel speed during the interval; and
   provide a real-time visual, audible, and/or tactile indication of the actual travel speed.

9. The system of claim 8, where the actual travel speed is used to determine actual weld size.

10. The system of claim 1, wherein the one or more actual motion attributes comprise actual travel speed and the processing subsystem is operable to:
    process the data generated by the IMU to determine instantaneous travel speed of the hand-held weld tool at one or more time instants during the weld operation;
    average the instantaneous travel speed over an interval to determine the actual travel speed during the interval; and
    adaptively control, based on the actual travel speed, one or more of:
       heat input per unit length during the weld operation such that the heat input per unit length remains within determined thresholds during the weld operation;
       weld length;
       weld size during the weld operation such that the weld size remains within determined thresholds during the weld operation; and
       cooling rate during the weld operation such that the cooling rate remains within determined thresholds during the weld operation.

11. The system of claim 1, wherein the one or more actual motion attributes comprise actual travel speed and the processing subsystem is operable to:
    process the data generated by the IMU to determine instantaneous travel speed of the hand-held weld tool at one or more time instants during the weld operation; and average the instantaneous travel speed over an interval to determine the actual travel speed during the interval; and store the actual travel speed to a database to which it is communicatively coupled.

12. The system of claim 1, wherein the one or more actual motion attributes comprise actual travel speed and the processing subsystem is operable to:
process the data output by the IMU to determine instantaneous travel speed of the hand-held weld tool at one or more time instants during the weld operation; and
average the instantaneous travel speed over an interval to determine the actual travel speed during the interval; and
determine the weld length during the interval based on accumulation of the actual travel speed during the interval.

13. The system of claim 1 wherein the processing subsystem is operable to compute, based on data generated by the IMU during the weld operation on a workpiece, actual weld length during the weld operation.

14. The system of claim 13, where the actual weld length is used to determine actual weld size.

15. The system of claim 14, comprising a non-IMU sensor, wherein:
the non-IMU sensor is operable to measure instantaneous welding power;
the processing subsystem is operable to integrate instantaneous power over time to determine actual heat input;
the processing subsystem is operable to determine the actual heat input per unit length by dividing the actual heat input by the actual weld length.

16. The system of claim 15, wherein the processing subsystem is operable to provide at least one of a real-time visual indication, a real-time audible indication, or a real-time tactile indication of the actual heat input.

17. The system of claim 15, wherein the processing subsystem is operable to adaptively control, based on the actual heat input, one or more of:
heat input per unit length during the weld operation such that the heat input per unit length remains within determined thresholds during the weld operation;
weld size during the weld operation such that the weld size remains within determined thresholds during the weld operation; and
cooling rate during the weld operation such that the cooling rate remains within determined thresholds during the weld operation.

18. The system of claim 15, wherein the processing subsystem is operable to store the actual heat input to a database to which it is communicatively coupled.

19. The system of claim 1, wherein the portable fixture comprises one or more tool parking spots at a known spatial and orientation relative to a fixture on which the weld operation is to be performed.

20. The system of claim 1, wherein the motion attribute is one of: actual torch angle during the weld operation, actual travel angle during the weld operation, actual weld position relative to the workpiece during the weld operation, and actual weld location within the workpiece during the weld operation.

21. The system of claim 1, comprising a training apparatus that comprises an IMU and that is configured to output data from said IMU while tracing a previously-welded or to-be-welded path for training of a manual or robotic weld.

22. The system of clam 1, wherein said hand-held tool and/or its power source are configured among a low-power state and a ready state based on the data generated by the IMU.

23. The system of claim 1, comprising processing circuitry communicatively coupled to the positioning and orientation measurement system via a network connection, wherein:
the processing circuitry is operable to generate predictions of mechanical properties of a weld formed during the weld operation; and
the predictions are used in generating feedback signals for control, during the weld operation, of the hand-held weld tool, a power source of the hand-held tool, and/or a wire feeder that feeds wire to the hand-held weld tool.

24. The system of claim 1, wherein the portable fixture comprises a plurality of holsters orthogonally oriented in three-dimensional space.

25. The system of claim 1, wherein the sensor is configured to detect when the hand-held weld tool is properly positioned in the holster for calibration by detecting a ferromagnetic material block on the hand-held weld tool.

26. A system comprising:
a hand-held weld tool comprising a positioning and orientation measurement system having an inertial measurement unit (IMU);
a camera configured to capture images of the hand-held welding tool during a weld operation on a workpiece;
a portable fixture, comprising:
a holster configured to maintain the hand-held weld tool in a known position and orientation and in stationary state for calibration of the IMU; and
a sensor configured to detect when the hand-held weld tool is properly positioned in the holster by detecting a component on the hand-held weld tool as present within the holster, wherein the processing subsystem is configured to calibrate the IMU by recording an output of the IMU in response to the sensor detecting that the hand-held weld tool is properly positioned in the holster, and the processing subsystem is configured to compensate for drift in the data generated by the IMU based on the output of the IMU during the calibration; and
a processor configured to:
determine, based on data generated by the IMU, a weld position of the weld operation; and
compute, based on data generated by the IMU during a weld operation on a workpiece, one or more actual motion attributes for the hand-held weld tool.

27. A system comprising:
a hand-held weld tool comprising a positioning and orientation measurement system having an inertial measurement unit (IMU);
a holster configured to maintain the hand-held weld tool in a known position and orientation and in stationary state for calibration of the IMU; and
a processor configured to:
determine, based on data generated by the IMU, a weld position of the weld operation; and
compute, based on the data generated by the IMU, one or more actual motion attributes for the hand-held weld tool during the welding operation.

28. The system as defined in claim 1, wherein the processor is configured to determine the weld position from a set of positions including at least one of a 1G position, a 2G position, a 3G position, a 4G position, a 5G position, or a 6G position.

* * * * *